US007991398B2

(12) United States Patent
Rune

(10) Patent No.: US 7,991,398 B2
(45) Date of Patent: Aug. 2, 2011

(54) ARRANGEMENTS AND METHOD FOR HANDLING MACRO DIVERSITY IN A UNIVERSAL MOBILE TELECOMMUNICATIONS SYSTEM

(75) Inventor: Johan Rune, Terrängvägen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 777 days.

(21) Appl. No.: 10/583,894

(22) PCT Filed: Mar. 30, 2004

(86) PCT No.: PCT/SE2004/000482
§ 371 (c)(1),
(2), (4) Date: Jun. 22, 2006

(87) PCT Pub. No.: WO2005/062655
PCT Pub. Date: Jul. 7, 2005

(65) Prior Publication Data
US 2007/0197222 A1    Aug. 23, 2007

(30) Foreign Application Priority Data
Dec. 22, 2003    (SE) ...................................... 0303463

(51) Int. Cl.
*H04W 36/00*    (2009.01)
*H04W 24/00*    (2009.01)
*H04L 12/66*    (2006.01)

(52) U.S. Cl. ...................... 455/436; 455/438; 455/456.2; 370/352

(58) Field of Classification Search .................. 370/331, 370/352, 469, 338, 236; 455/560, 456.2, 455/446, 414.1, 423, 438, 403, 450
See application file for complete search history.

(56) References Cited

U.S. PATENT DOCUMENTS

| 5,539,922 | A  | * | 7/1996 | Wang ........................... 455/456.2 |
| 6,321,271 | B1 |   | 11/2001 | Kodialam et al. |
| 6,687,249 | B1 |   | 2/2004 | Noguera-Rodriguez et al. |
| 7,171,206 | B2 | * | 1/2007 | Wu ................................ 455/438 |
| 2001/0053145 | A1 | * | 12/2001 | Willars et al. .................. 370/352 |

(Continued)

FOREIGN PATENT DOCUMENTS
EP    1 014 627 A1    6/2000

(Continued)

OTHER PUBLICATIONS
International Search Report for PCT/SE2004/000482 dated Sep. 24, 2004.

(Continued)

*Primary Examiner* — Charles N Appiah
*Assistant Examiner* — Kiet Doan
(74) *Attorney, Agent, or Firm* — Nixon & Vanderhye P.C.

(57) ABSTRACT

The present invention relates to methods and arrangements for providing macro diversity, also referred to as diversity handover, DHO, related instructions to a node, e.g. a Node B, that is a part of a DHO connection in a mobile telecommunication network wherein the macro diversity functionality is distributed to a Radio Network Controller, RNC, and its connected Node Bs in said network. The method comprises the steps of:
    including in a signaling message one or more transport layer addresses and one or more transport bearer reference parameters in order to direct one or more data flows of the DHO connection, and
    sending said signaling message to said node.

49 Claims, 17 Drawing Sheets

Macro diversity leg

U.S. PATENT DOCUMENTS

| | | | |
|---|---|---|---|
| 2002/0082015 A1 | 6/2002 | Wu | |
| 2002/0183053 A1* | 12/2002 | Gopalakrishna et al. | 455/423 |
| 2003/0003919 A1* | 1/2003 | Beming et al. | 455/446 |
| 2003/0099255 A1* | 5/2003 | Kekki et al. | 370/469 |
| 2004/0029615 A1* | 2/2004 | Gerry et al. | 455/560 |
| 2004/0203640 A1* | 10/2004 | Molander et al. | 455/414.1 |

FOREIGN PATENT DOCUMENTS

| | | |
|---|---|---|
| JP | 2000-196650 | 7/2000 |
| JP | 2003-258704 | 9/2003 |
| WO | 03017686 A2 | 2/2003 |
| WO | 03/049482 | 6/2003 |
| WO | 03/096632 A1 | 11/2003 |
| WO | 03/096733 A1 | 11/2003 |

OTHER PUBLICATIONS

Marchent et al., *Support of Mobile Multimedia over Radio for a Range of QoS and Traffic Profiles*, Vehicular Technology Conference, 1999 IEEE 49th, vol. 2, May 16-20, 1999, pp. 1540-1544.

Nakano et al., *Performance of Diversity Handover in DS-CDMA Cellular Systems*, Universal Personal Communications, 1995 Fourth IEEE International Conference, Nov. 6-10, 1995.

International Search Report of PCT/SE2004/000478, mailed Sep. 24, 2004.

* cited by examiner

US 7,991,398 B2

ARRANGEMENTS AND METHOD FOR HANDLING MACRO DIVERSITY IN A UNIVERSAL MOBILE TELECOMMUNICATIONS SYSTEM

This application is the US national phase of international application PCT/SE2004/000482 filed 30 Mar. 2004, which designated the U.S. and claims priority to SE 0303463-4 filed 22 Dec. 2003, the entire content of which is hereby incorporated by reference.

TECHNICAL FIELD

The technical filed of the present disclosure relates to arrangements and a method in a third generation mobile telecommunication system and evolved variants thereof. In particular, the invention relates to arrangements and a method for handling macro diversity in a UMTS Radio Access Network (UTRAN).

BACKGROUND

Third generation (3G) mobile communication systems (e.g. Universal Mobile Telecommunications System (UMTS)) shall offer high quality voice and data services for mobile users. The systems shall also provide high capacity and universal coverage. In some situations that may however be difficult to fulfil, due to unreliable radio channels. One promising technique to combat link reliability problems over the radio interface is macro diversity techniques. Macro diversity should however also be seen as an inherent consequence of using Code Division Multiple Access (CDMA) as the multiple access technique in a cellular network. CDMA is an interference limited technology. That is, it is the interference in a cell that sets the upper limit for the cell's capacity. To keep the interference as low as possible it is essential that the base station controls the output power of the radio transmitters of the mobile terminals in the cell, i.e. fast and efficient power control is essential. As a mobile terminal moves towards the periphery of a cell it has to increase the power of its radio transmission in order for the base station to be able to receive the transmitted signal. Likewise, the base station has to increase the power of its radio transmission towards the mobile terminal. This power increase has a deteriorating effect on the capacity of both the mobile terminal's own cell and the neighbouring cell(s) which the mobile terminal is close to. Macro diversity is used to mitigate this effect. When the mobile terminal communicates via more than one base station, the quality of the communication can be maintained with a lower radio transmission power than when only a single base station is used. Thus, macro diversity is both a feature raising the quality of unreliable radio channels and a necessity that is required in order to overcome an inherent weakness of CDMA based cellular systems.

FIG. 1 illustrates a UTRAN. The Radio Network Controller (RNC) 102 is connected to the Core Network 100 that in turn may be connected to another network. The RNC 102 is connected to one or more Node Bs 104 also denoted base stations via a transport network 106. The transport network 106 may e.g. be IP-based or ATM-based. The transport network nodes are indicated with a "T" in FIG. 1. In an IP based transport network these nodes are IP routers. In an ATM based transport network the transport network nodes are AAL2 (ATM Adaptation Layer type 2) switches. The Node Bs 104 may be wirelessly connected to one or several User Equipments (UEs) 110 also denoted mobile terminals. A Serving-RNC (S-RNC) 102 is a RNC that has a Radio Resource Connection (RRC) connection with the UE 110. A Drift-RNC (D-RNC) 112 is a RNC that may be connected to a UE 110, but where another RNC 102, i.e. the S-RNC, handles the RRC connection with the UE 110.

Macro diversity enables a mobile station to communicate with a fixed network by more than one radio link, i.e. a mobile can send/receive information towards/from more than one radio port (or base station also denoted Node B). The radio ports (RPs) are spatially separated at distance from a short distance, e.g. between different floors in a building, (picocells) up to about some kilometres (micro- and macro-cells). As the propagation conditions between the mobile terminal and the different RPs, are different at the same moment in time, the resulting quality of the combination of the received signals is often better than the quality of each individual signal. Thus, macro diversity can improve radio link quality. When a mobile terminal is connected to more than one base station simultaneously, the UE is said to be in soft handover.

Macro diversity is applicable only to dedicated channels (DCH). Currently all the macro diversity functionality resides in the RNC provided that the corresponding functionality for softer handover in Node B is not considered. Softer handover implies that a UE has two or more radio links to the same Node B. The softer handover combining performed in the uplink in the Node B is more advanced than the selective combining performed in the RNC. In the downlink, the splitting is performed in the RNC, which ensures that a copy of each downlink DCH FP frame is sent through each leg in the active set of the concerned DCH. Both DCH FP data frames and DCH FP control frames are subject to the splitting function.

In the uplink, the RNC performs the combining, which is more complicated than, the splitting. Only DCH FP data frames are subject to the combining procedure. DCH FP control frames are not combined, since each uplink DCH FP control frame includes control data that is specific for an individual Node B. For the uplink, the RNC has a time window in which all legs are expected to deliver their contribution to the combining (i.e a DCH FP frame with a certain Connection Frame Number (CFN)). At the expiration of the time window, all the DCH FP frames with the correct CFN that were received within the time window are passed to the combining function.

The actual combining is a selection of the best piece of data out of the candidates that were received through the different legs. For non-voice DCHs, the unit of selection is a transport block (TB). To determine which of the candidates to select for a certain transport block, the Cyclic Redundancy Checksum Indicator (CRCI) for the concerned TB is checked in each of the delivered frames. If one and only one of them indicates that the TB was correctly received at the Node B (i.e. that the CRC check was successful for the concerned TB when it was received by the Node B), this TB is selected. Otherwise, if more than one of the CRCIs indicate successful CRC check, the combining function selects the one of these TBs that belongs to the frame with the greatest Quality Estimate (QE) parameter. The QE parameter is a measure of the current bit error rate over the radio interface. Likewise, if all of the CRCIs indicate unsuccessful CRC check, the combining function selects the TB from the frame with the greatest QE parameter. If in the two latter cases, the greatest QE parameter value is found in two or more of the frames (i.e. if these QE parameters are equal too), the selection of TB is implementation dependent. FIG. 2 illustrates the combining procedure for non-voice DCHs.

For voice DCHs, the combining works slightly differently. The Adaptive Multi Rate (AMR) speech codec produces three subflows, wherein each are transported in a respective DCH. These three DCHs are so-called coordinated DCHs. The coordinated DCHs are included in the same DCH FP frame and there is only one TB for each subflow in a frame. During the combining, the combining function does not select separate TBs from different candidate frames to create a new combined frame as described above in the context of non-voice DCHs. Instead it selects one entire frame based on the CRCI for the TB associated with subflow 1, which is the most significant subflow. The CRCI of the other subflows are insignificant, since these subflows are not CRC protected over the radio interface. Again, if the CRCIs indicated unsuccessful CRC check or because all of the concerned CRCIs indicate unsuccessful CRC check, the frame with the greatest QE parameter is selected. FIG. 3 illustrates the combining procedure for voice DCHs.

Hence macro diversity in current UTRANs is realised through macro diversity functionality, also denoted as Diversity Handover (DHO) functionality in the RNCs. The current standards allow DHO functionality in both the Serving RNC (S-RNC) and the D-RNC, but the possibility to locate the DHO functionality in the D-RNC is commonly not used.

Thus, a problem in the existing macro diversity solutions is that the split downlink flows and the uncombined uplink flows of user data are transported all the way between the RNC and the Node B. That results in that costly transmission resources are consumed in the UTRAN transport network, which also results in significant costs for the operators.

SUMMARY

The consumed transmission resources are reduced according to a non-limiting aspect the present invention by distributing the macro diversity functionality to the Node Bs. A problem is then how to select which of the connected Node Bs that should be selected to perform the combining/splitting function, also referred to as a Diversity Handover (DHO) function. These selected nodes are referred to as DHO nodes. The DHO nodes are selected out of those Node Bs that are able to perform the DHO functionality, i.e. out of those Node Bs that have been adapted with DHO functionality. These nodes are referred to as DHO enabled nodes or macro diversity enabled nodes. One non-limiting example method for selecting the DHO nodes is disclosed in this disclosure, however other methods may also be used. When the DHO nodes are selected e.g. in accordance with the disclosed method, a method and arrangements for executing the macro diversity is required.

One of several significant advantages achieved by the present invention is transmission savings in the UTRAN transport network, which translate into significant cost savings for the operator. The transmission savings are realised through optimised location for the DHO functionality. Thereby the redundant data transport is eliminated in the parts of the path, where data pertaining to different macro diversity legs of the same DCH would otherwise be transported in parallel along the same route.

Another advantage is that the RNCs may be located in more central locations of the network (i.e. with less geographical distribution). The main purpose of the current common geographical distribution of RNCs is to limit the transmission costs for the parallel macro diversity legs. When this parallel data transport is eliminated, it becomes more beneficial for an operator to centralise the RNCs, e.g. by co-locating them with MSCs or MGWs. Co-locating several nodes on the same site results in simplified operation and maintenance, which also means reduced costs for the operator.

DETAILED DESCRIPTION

Figure 1:
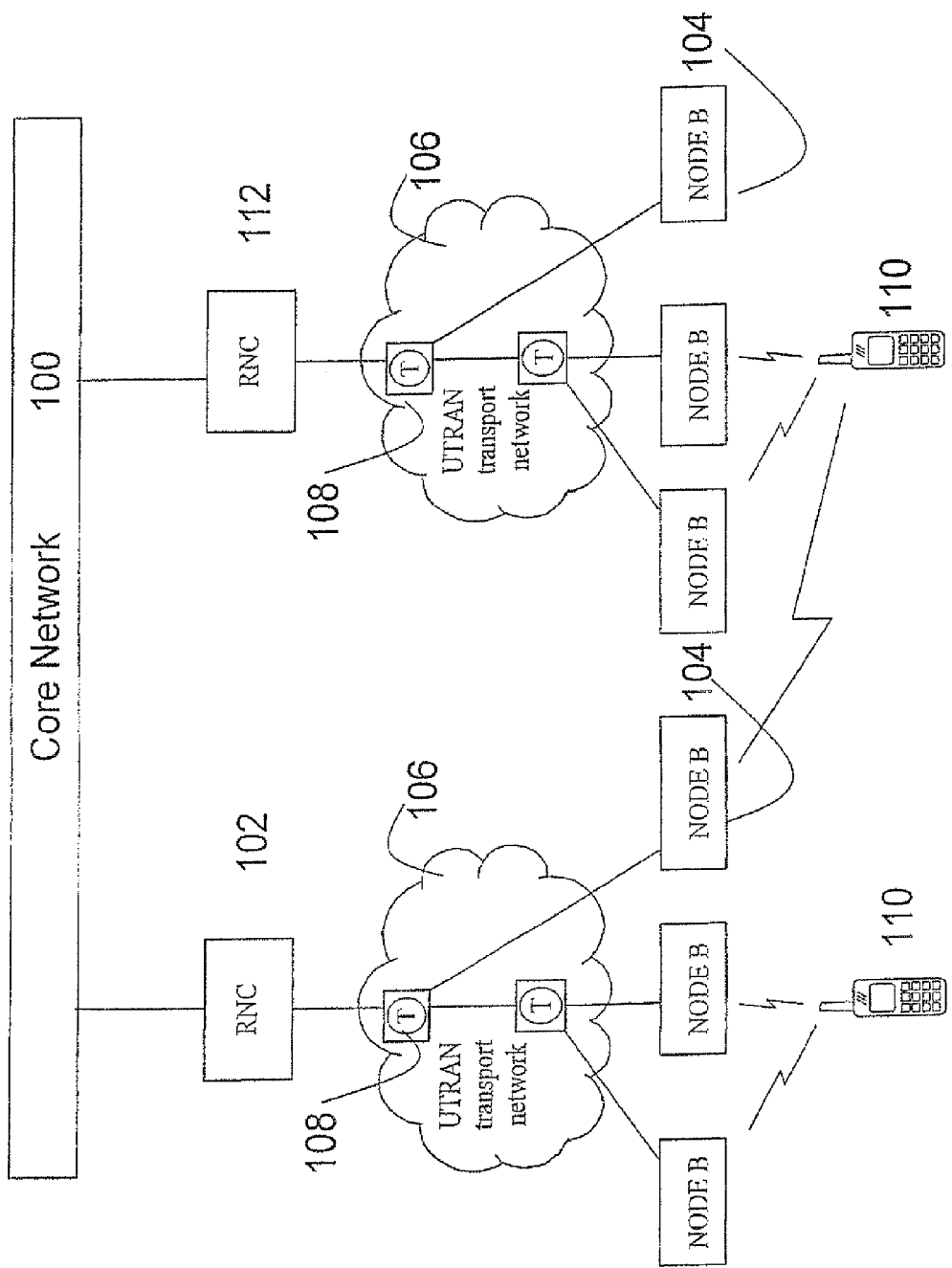
FIG. 1 is a schematic illustration of a UMTS Terrestrial Radio Access Network
Figure 2:
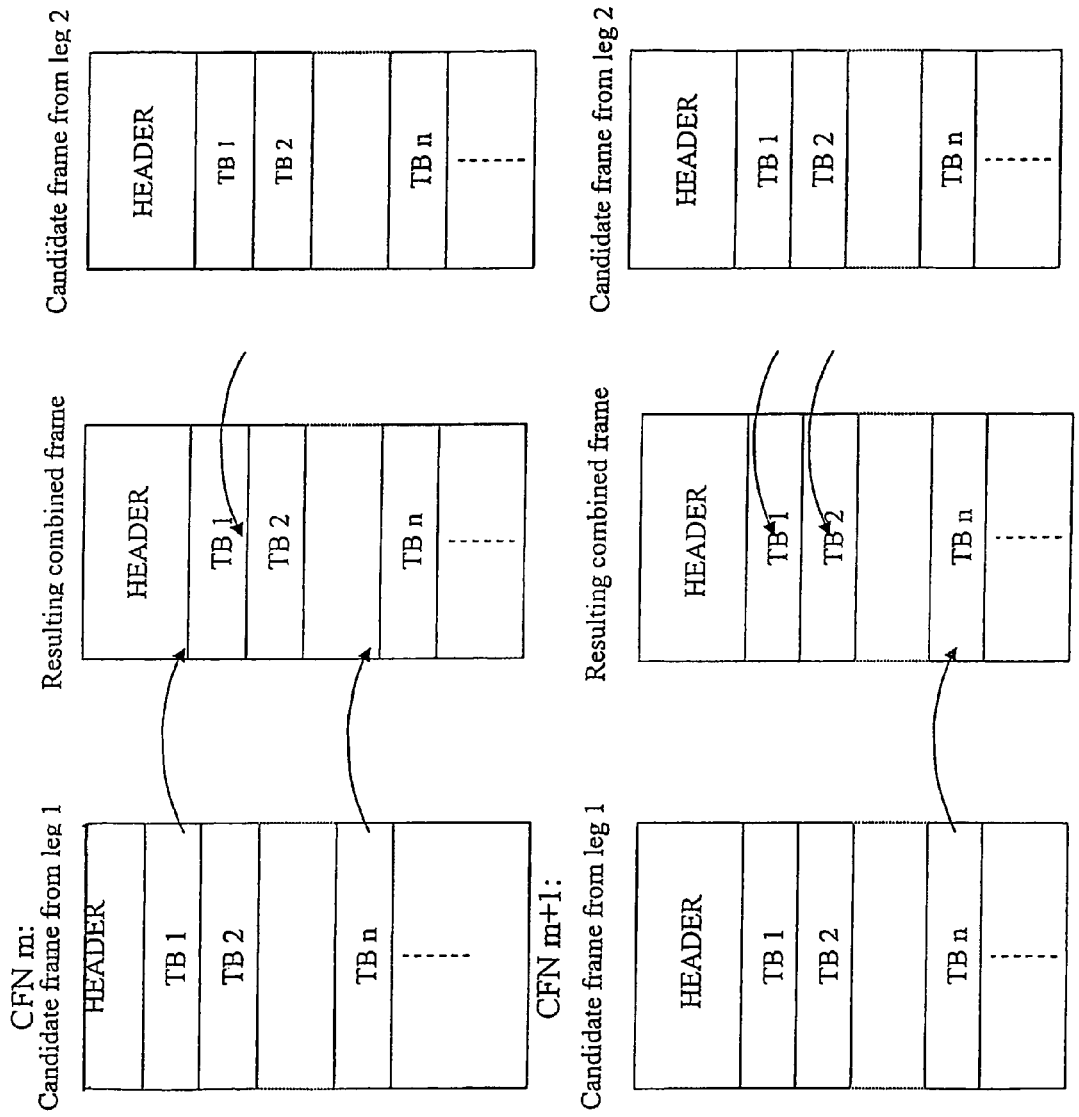
FIG. 2 illustrates the combining procedure for non-voice DCHs.
Figure 3:
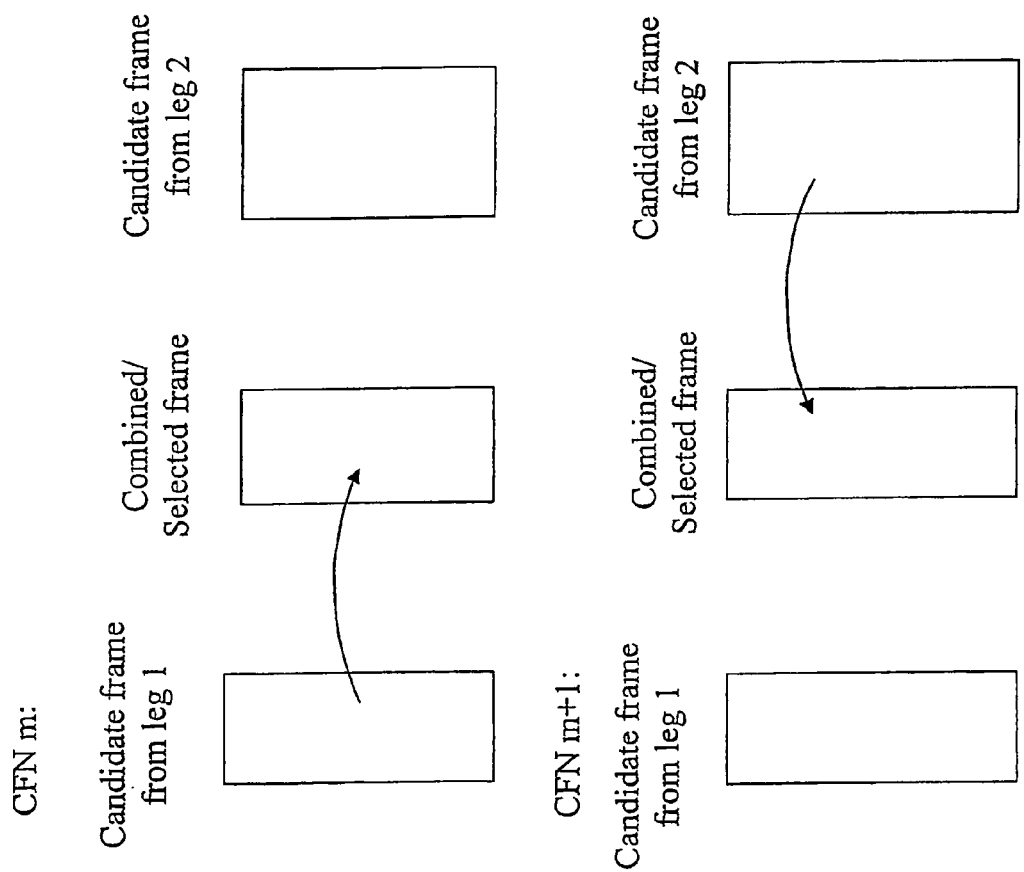
FIG. 3 illustrates the combining procedure for voice DCHs.

The present invention will now be described more fully hereinafter with reference to the accompanying drawings, in which preferred embodiments of the invention are shown. This invention may, however, be embodied in many different forms and should not be construed as limited to the embodiments set forth herein; rather these embodiments are provided so that this disclosure will be thorough and complete, and will fully convey the scope of the invention to those skilled in the art. In the drawings, like numbers refer to like elements.

In the further description of the present invention coordinated DCHs are not specifically treated. In the aspects that are significant, a set of coordinated DCHs is treated in the same way as a single separate DCH. The DCHs of a set of coordinated DCHs use a common transport bearer and in an IP UTRAN the frames (of a set of coordinated DCHs) with the same CFN are included in the same User Datagram Protocol (UDP) packet. The special combining procedure for coordinated DCHs has been described above. Thus, omitting coordinated DCHs serves to simplify the description and makes the text more readable. To generalize the description of the present invention so as to comprise coordinated DCHs would be conceptually trivial for a person of ordinary skills in the art, although it would significantly complicate the text.

One or more non-limiting aspects may be implemented in a third generation mobile telecommunications system, e.g. in a UMTS, and in particular in the Radio Access Network (RAN), e.g. a UMTS Terrestrial Radio Access Network, UTRAN. Such a system is illustrated in FIG. 1 and described above in conjunction with FIG. 1.

Figure 4:
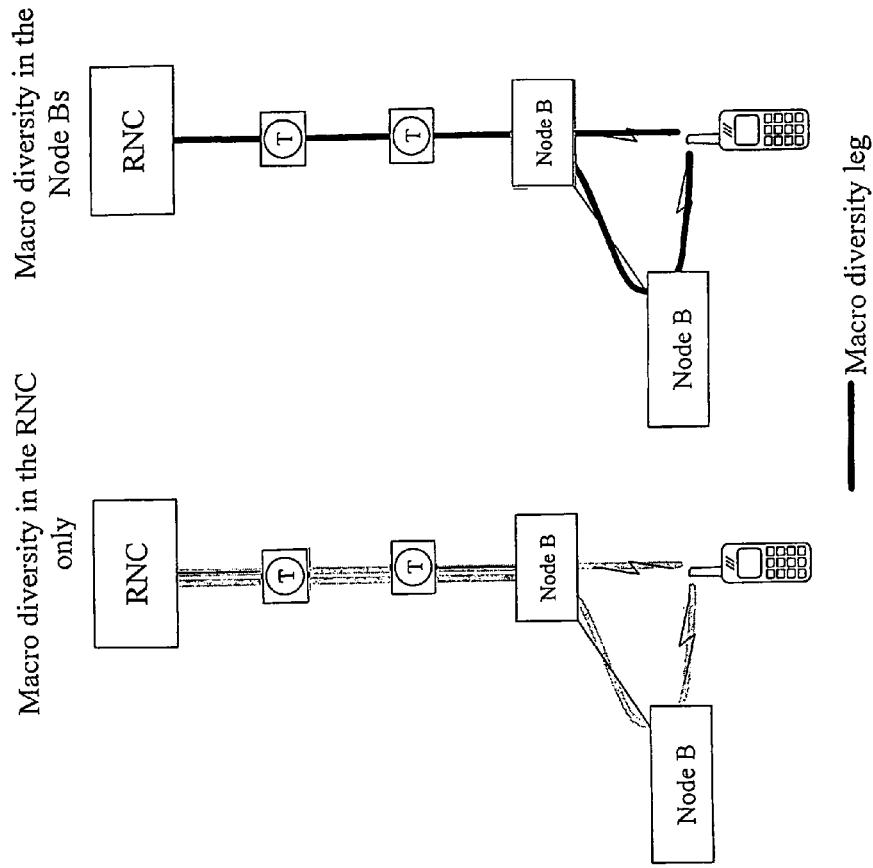
FIG. 4 illustrates potential transmission savings in an illustrative non-limiting example with cascaded Node Bs.

In order to reduce the required transmission resources, it is proposed to distribute the macro diversity functionality from the RNC to other nodes for macro diversity configurations for which this is beneficial from a transmission point of view. These other nodes are typically Node Bs, but may also be other types of nodes, e.g. specialized Diversity Handover nodes. The potential transmission savings when the macro diversity is distributed to Node Bs are illustrated in FIG. 4. When a macro diversity configuration, also referred to as a Diversity Handover (DHO) node tree (the term "DHO node tree" is further explained later) is established, or changed, it is preferred to select the Node Bs that should be the DHO nodes, i.e. the Node Bs that should perform the actual combining and splitting, before the macro diversity function is executed. The DHO nodes should be selected out of the available nodes that comprise DHO functionality, i.e. out of the DHO enabled nodes (typically DHO enabled Node Bs and RNCS). In the non-limiting examples below, the Node Bs and the RNC are used as DHO nodes, but it should be noted that other nodes such as specialized DHO nodes or logically or geographically distributed RNCs or future types of nodes implementing parts of the RNC functionality also may be used as DHO nodes.

A further term, a DHO tree node, is introduced in this specification. The DHO tree node may be any node within the DHO node tree. That implies that the DHO tree node may be a DHO node as described above, an RNC without DHO functionality or a Node B without DHO functionality, e.g. a leaf Node B.

Furthermore, a Node B that is responsible for a radio link towards the UE (i.e. a Node B that is included in the active set) is henceforth referred to as a "radio active Node B". A Node B that is not responsible for a radio link towards the UE (i.e. a Node B that is not included in the active set) is henceforth referred to as a "non-radio active Node B". Correspondingly, a DHO node that is responsible for a radio link towards the UE (i.e. a radio active Node B) is referred to as a "radio active DHO node". Other DHO nodes are referred to as "non-radio active DHO nodes".

Selection of DHO Nodes

An example illustrative non-limiting of a method for selecting DHO nodes is described below. It should however be noted that other methods for this selection also may be used.

In order to select the DHO nodes, the first step that is performed is to obtain topology information of the UTRAN transport network and how the nodes within the transport network are connected to the Node Bs. The topology information may for example be obtained in the topology map illustrated in FIG. 5.

The topology information may be obtained by developing a topology database. The topology database is adapted to provide the RNC with the information the RNC needs in order to determine when distribution of the DHO functionality to the Node Bs is beneficial and to select the Node Bs to be involved. The topology database is first described for an Internet Protocol (IP) based UTRAN, including its general properties and ways to create it. Then, in a further section, the topology database for an ATM based UTRAN is described.

To enable selection of the DHO node(s), the RNC should have or be adapted to retrieve information about the topology of the UTRAN, both the UTRAN transport network and the Node Bs and RNCs. Different levels of richness of this information are conceivable. The choice of this level is a trade-off between the value it provides for the DHO node selection mechanism and the complexity it implies for the selection mechanism as well as the topology information retrieval mechanism. A certain level of flexibility of the richness of the topology information will be allowed in the further description of the DHO node selection.

However, a non-limiting example topology information with a basic level of richness can include:

A hop-by-hop route from the RNC to each Node B that is controlled by the RNC and possibly some Node Bs that are controlled by neighboring RNCs, wherein each router is represented by the IP address associated with the interface that is used to forward packets in the direction of the RNC. The Node B is represented by one of its IP addresses, e.g. the one used for NBAP (Node B Application Part) signaling (or the primary IP address used for NBAP signaling in case multiple IP addresses are used for NBAP signaling). If a neighboring RNC is included in a hop-by-hop route, it is also represented by one of its IP addresses, e.g. the one used for RNSAP (Radio Network Subsystem Application Part) signaling (or the primary IP address used for RNSAP signaling in case multiple IP addresses are used for RNSAP signaling).

A delay metric for each hop in a route. If no explicit delay metric is available, an approximation can be derived from the generic cost metric, which is described below, or all hops can be given the same delay metric.

A generic cost metric for each hop in a route. If no such generic cost metric is explicitly available, a reasonable approximation can be derived from the delay metric or a fixed default cost metric can be used for all hops. Preferably, the RNC is adapted to use the topology information to maintain data representations of the hop-by-hop routes with associated metrics to all the Node Bs in the Radio Network Subsystem (RNS) (and possibly to some Node Bs controlled by neighboring RNCs, i.e. Node Bs in neighboring RNSs). The RNS comprises the RNC and the Node Bs that are controlled by the RNC. Then the routes are readily available when needed for a DHO node selection process. However, retrieving topology information and creating the hop-by-hop routes in real-time when needed is also a possibility if the RNC maintains a generic topology database. For instance if the Transport Network Layer (TNL) in the RNC maintains a link state routing topology database, it is conceivable that this database is consulted (e.g. by letting the Radio Network Layer (RNL) of the RNC interrogate the TNL of the RNC) in order to create the required hop-by-hop route representations in real-time. From a performance perspective it is preferable that the hop-by-hop routes are readily available when they are needed.

In addition to the required topology information the RNC should be manually or automatically configured with knowledge about the relevant Node Bs that are able to comprise DHO functionality, also referred to as DHO enabled nodes. The DHO enabled nodes include at least the DHO enabled nodes controlled by the RNC, but in inter-RNS macro diversity configurations they may also include other RNCs and Node Bs controlled by other RNCs. It is also possible that the DHO enabled nodes may include other, yet non-existing, types of Radio Network Layer (RNL) nodes, e.g. specialized DHO nodes. The RNC should know at least one IP address of each DHO enabled node, preferably the IP address used for NBAP signaling (or RNSAP signaling in the case of an RNC). This IP address should be the same IP address as is used to represent the node in a hop-by-hop route. The RNC may be adapted to use the list of DHO enabled nodes to include an indication of whether the node is DHO enabled or not for each node in the hop-by-hop routes.

Disclosed below, are four possible ways for an RNC to provision the required topology information:
1. Through manual or semi-automatic management operations.
2. Via a link state routing protocol.
3. By using a traceroute mechanism that allows the RNC to discover the hop-by-hop route to each Node B.
4. By retrieving topology information from another RNC. However, this method is only feasible in the inter-RNS case.

In the case when the UTRAN transport network is ATM based, the topology database is based on ATM addresses instead of IP addresses. Otherwise the general properties of the topology database are similar to the properties of the database in the IP based UTRAN. Each hop in a hop-by-hop route is represented by an ATM address. For each hop there is an explicitly defined or implicitly derived generic cost metric and an explicitly defined or implicitly derived delay metric. In the ATM based UTRAN, the topology database can be created through manual or semi-automatic management operations. The RNC uses the topology database in the same way in the ATM based UTRAN as in the IP based UTRAN.

The DHO Node Selection Algorithm

It should be noted that, although the procedures of the DHO node selection algorithm are described below using the terminology of an IP UTRAN, they are equally applicable in an ATM UTRAN. In an ATM UTRAN the algorithms and procedures are similar, but the routers are replaced by AAL2 switches and the IP addresses are replaced by ATM addresses.

The mechanism that the RNC is adapted to use in order to select the DHO node(s), i.e. the node(s) where the splitting and combining will be performed, is(are) substantially the same whether optimized NBAP and RNSAP signaling is used or not. One object of the DHO node selection mechanism is to select the DHO nodes in a way that minimizes one or more accumulated metric for the all the macro diversity legs. Such an accumulated metric may be a generic cost metric. This cost metric may be put together with a condition that for none of the resulting data paths is the resulting path delay allowed to exceed a maximum delay value defined for the UTRAN.

In the typical scenario, a DCH is first established with a single leg, i.e. without macro diversity. When a second macro diversity leg is added, the RNC selects a DHO node for these two legs and redirects the existing data flow if necessary (i.e. unless the selected DHO node is the Node B of the first leg or the RNC itself. When a third leg is added, the RNC is likely to rerun the DHO node selection process from scratch, since the addition of the third leg may affect the selection of the first DHO node. Alternatively, the RNC also has the choice to let the third leg go all the way to the RNC (without trying to find a better DHO node) in order to not to affect the previous DHO node choice and to avoid the signaling involved in redirecting the existing flows. The same (i.e. rerunning the DHO node selection process from scratch or terminating the new leg in the RNC) applies to subsequently added macro diversity legs.

A non-limiting example DHO node selection mechanism relies on the above described topology information involving both transport networks nodes (routers) and radio network nodes (Node Bs and one or possibly more RNCs). It also utilizes the list of DHO enabled nodes connected to the RNC (and possible some DHO enabled nodes in neighboring RNSs).

The RNC selects a first set of preliminary DHO nodes in a way that minimizes the total accumulated generic cost metrics for the entire macro diversity tree. It then checks whether the maximum allowed path delay is exceeded for any of the macro diversity legs according to one non-limiting embodiment. If the path delay is acceptable, the set of preliminary DHO nodes can be kept. Otherwise the set of preliminary DHO nodes can be modified by the RNC in a way that reduces the path delays until the path delays of all macro diversity legs are acceptable.

Selection of the First Set of Preliminary DHO Nodes

Figure 7:
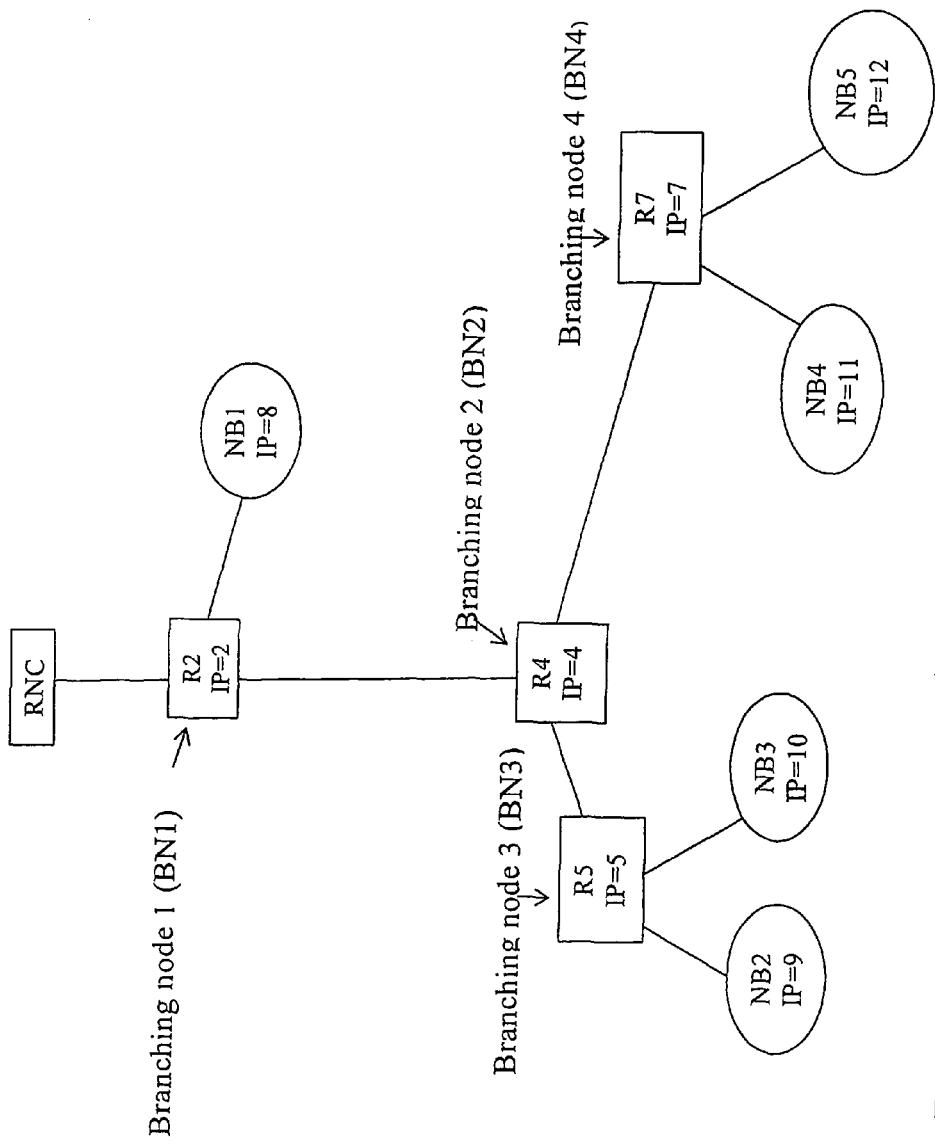
FIG. 7 shows a branching node tree corresponding to the route tree in FIG. 6.

In short the RNC starts the DHO node selection process by forming a tree of the routes (retrieved from the topology database) to the involved Node Bs. It then identifies the branching nodes in the tree and their relative interconnections. Identifying the relative interconnections of the branching nodes in essence implies that the RNC creates a simplified schematic tree that includes only branching nodes, Node Bs and the RNC (i.e. intermediate routers are omitted). The simplified schematic tree is illustrated in FIG. 7. For each branching node there is a corresponding potential DHO node and the RNC is arranged to proceed to select these DHO nodes. A detailed description of the complete process follows below.

Figure 5:
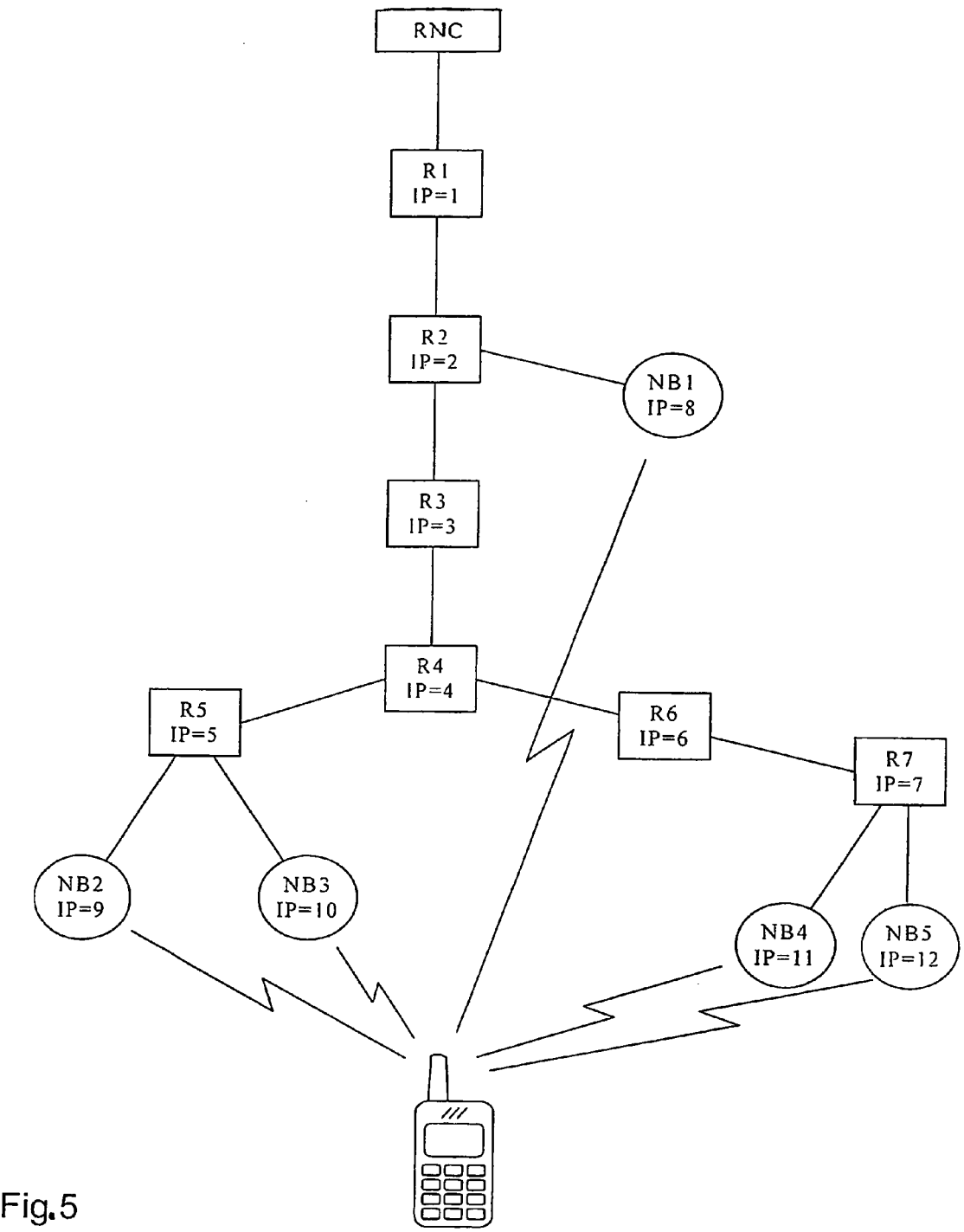
FIG. 5 illustrates a non-limiting example scenario with a mobile terminal using five macro diversity legs.

An example of the DHO node selection process based on a scenario depicted in FIG. 5 will be used throughout the description. The provided example is however only included to further facilitate the understanding of the present invention and not in order limit the present invention. FIG. 5 illustrates a DCH in soft handover mode with five macro diversity legs. The purpose of the illustrated example is to illustrate the principles of the DHO node selection process. R1-R7 in the FIG. 5 are routers and NB1-NB5 are Node Bs. IP=X means that the IP address of the node is X.

In a general case, the RNC has n (where n>1) connected Node Bs that are involved in the same DCH in soft handover mode. To select the DHO nodes for the DCH the RNC is adapted to retrieve from its above described topology database the full hop-by-hop routes between the RNC and each of the involved Node Bs. The retrieved routes form a "route tree". Nodes where two or more routes join are called branching nodes (BNs). The RNC comprises means for selecting the best DHO node(s) based on the nodes of the route tree. To only search for DHO nodes in the route tree is a restriction, which means that potential off-tree DHO nodes, which could be more optimal than on-tree DHO nodes, are disregarded. This restriction is a trade-off to limit the complexity of the selection mechanism. If the best of all potential DHO nodes (on-tree as well as off-tree nodes) were to be sought and an optimal route tree (independent of the individual routes) were to be created, this would involve calculation of Steiner trees, which is very complex and computation demanding. Thus, although not optimal, selecting the DHO node(s) from the on-tree nodes is considered good enough for this application at least in its basic form.

A retrieved hop-by-hop route is represented by a list of IP addresses (the IP addresses of the intermediate routers and the destination Node B), accompanied by a number of metrics for each hop. The IP address of the RNC is omitted, since it is not needed for the DHO node selection process. The metrics may include one or both of a delay metric and a generic cost metric (based on arbitrary criteria). The metrics may be asymmetric, in which case one set of metrics is supplied for each direction of a link, or symmetric, in which case the same set of metrics is valid for both directions. In the illustrated example the metrics include both a symmetric delay metric and a symmetric generic cost metric. Table 1 shows the information that could be included in the route information that the RNC retrieves in the example scenario (i.e. the scenario depicted in FIG. 5).

TABLE 1

| IP addresses (excluding the RNC) | Symmetric generic cost metric for hop from preceding node | Symmetric delay metric for hop from preceding node |
|---|---|---|
| Route from the RNC to the Node B (NB) 1 | | |
| 1 | 1 | 1 |
| 2 | 1 | 2 |
| 8 | 1 | 3 |
| Route from the RNC to the NB2 | | |
| 1 | 1 | 1 |
| 2 | 1 | 2 |
| 3 | 2 | 3 |
| 4 | 2 | 3 |
| 5 | 3 | 4 |
| 9 | 5 | 5 |
| Route from the RNC to the NB3 | | |
| 1 | 1 | 1 |
| 2 | 1 | 2 |
| 3 | 2 | 3 |
| 4 | 2 | 3 |
| 5 | 3 | 4 |
| 10 | 4 | 5 |
| Route from the RNC to the NB4 | | |
| 1 | 1 | 1 |
| 2 | 1 | 2 |
| 3 | 2 | 3 |
| 4 | 2 | 3 |
| 6 | 2 | 3 |
| 7 | 3 | 4 |
| 11 | 4 | 5 |
| Route from the RNC to the NB 5 | | |
| 1 | 1 | 1 |
| 2 | 1 | 2 |
| 3 | 2 | 3 |
| 4 | 2 | 3 |
| 6 | 2 | 3 |
| 7 | 3 | 4 |
| 12 | 5 | 5 |

With reference to the example illustrated in FIG. 5, table 1 includes the routes with associated metrics received from the topology database. In this example symmetric delay and cost metrics are used.

Figure 6:
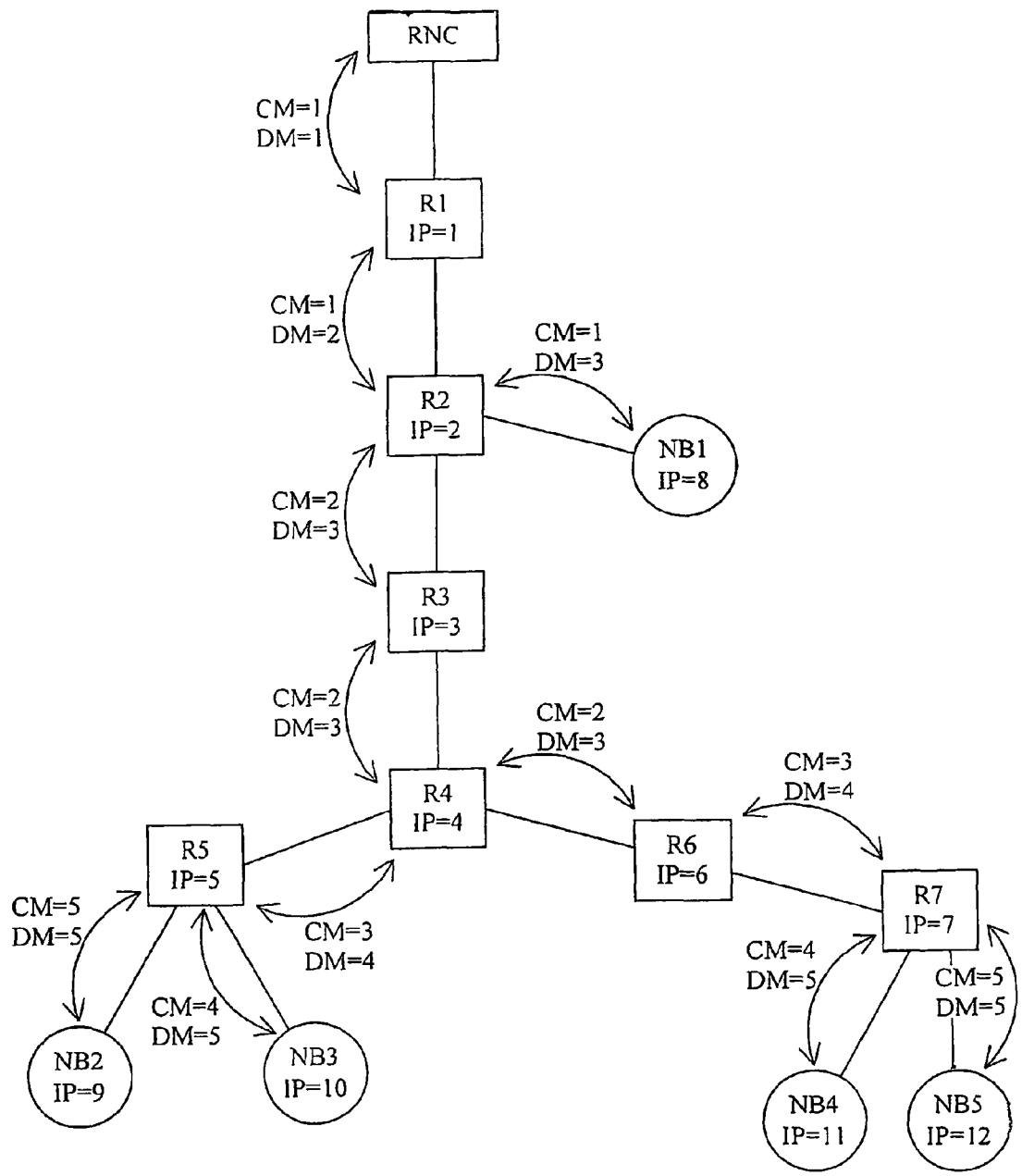
FIG. 6 shows a route tree resulting from the exemplified scenario of FIG. 5.

To form a tree of the retrieved routes the RNC is adapted to see the routes as branches and to identify the branching nodes (of which there may be 1 through n−1 where n is the number of branches). To identify the branching nodes, the RNC is arranged to start with the first IP address in the respective lists and then to step one address at a time to identify when a branch diverges, i.e. when its IP address differs from the IP address of the other branch(es). The IP address before a diverging IP address in the lists represents a branching node. If two branches have no IP address at all in common, then the RNC is the branching node for these two branches. The procedure continues until all branching nodes have been identified. FIG. 6 shows the route tree that results from the example scenario of FIG. 5.

When all the branching nodes have been identified, their relative interconnections, as well as their connections to Node Bs and the RNC, are identified. Identifying these connections in essence means that the RNC is adapted to create a simplified schematic tree consisting of only branching nodes, Node Bs and the RNC (i.e. intermediate routers are omitted). As is the case of the original route tree, this is still just a logical construction, essentially a data structure, in the RNC. It has yet no physical realization in the UTRAN. FIG. 7, illustrates a branching node tree corresponding to the route tree in FIG. 6 (i.e. the branching node tree resulting from the example scenario of FIG. 5) and table 2 shows how the branching node tree could be represented as a data table. It should be noted that BN X means branching node number X.

TABLE 2

| Branching node (BN) | IP address | Uplink connection | Downlink connections |
|---|---|---|---|
| BN1 | 2 | RNC | BN2, IP = 4 |
| | | | NB1, IP = 8 |
| BN2 | 4 | BN1, IP = 2 | BN3, IP = 5 |
| | | | BN4, IP = 7 |
| BN3 | 5 | BN2, IP = 4 | NB2, IP = 9 |
| | | | NB3, IP = 10 |
| BN4 | 7 | BN2, IP = 4 | NB4, IP = 11 |
| | | | NB5, IP = 12 |

An identified branching node may be an RNC, one of the Node Bs or an intermediate router. That is, it is not certain that a branching node is a DHO enabled node. However, for each branching node there is a corresponding potential DHO node. With a branching node as the starting point the RNC comprises means for selecting the best corresponding DHO node. To do this the RNC is arranged to make use of the cost metrics assigned to each hop and a list of the DHO enabled nodes in the RNS (represented by their IP addresses, i.e. the same IP addresses as are used to represent the nodes in hop-by-hop routes). In the inter-RNS case (i.e. when more than one RNS is involved) the RNC may also make use of lists of DHO enabled nodes in neighboring RNSs. In such case the RNC may be configured with these lists or it may retrieve them from the RNCs of the neighboring RNSs via signaling. In the DHO node selection example based on the example scenario of FIG. 5 the RNC and all the Node Bs in the route tree are assumed to be DHO enabled.

The algorithm used for selecting a DHO node corresponding to a certain branching node is simple. Starting from the branching node the RNC is able to accumulate the generic cost metric in each direction (i.e. in the direction of each branch in the original route tree including the uplink) from the branching node until a DHO enabled node (or the end of the path) is found. (If asymmetric generic cost metrics are used, the generic cost metrics should be the accumulated roundtrip from the branching node to the found DHO enable node and back. If symmetric cost metrics are used it suffices to accumulate the generic cost metrics in one direction.) The RNC does this by using the original route tree—not the simplified one. The DHO enabled node that was found with the smallest accumulated generic cost metric is selected as the DHO node corresponding to the concerned branching node. If the branching node is itself a DHO enabled node, it will of course be the selected DHO node, since it is obviously the best choice and the accumulated generic cost metric will be zero.

If more than one DHO enabled node is found with the same smallest accumulated generic cost metrics, the RNC should select the one that adds the least delay (in terms of accumulated delay metrics) to the original route from the concerned branching node to the RNC. To calculate the added delay for a certain DHO enabled node the RNC comprises means for identifying the node in the original route (i.e. the route from the concerned branching node to the RNC in the route tree) that is the closest to the DHO enabled node. The added delay is then calculated as the accumulated hop-by-hop delay metrics roundtrip from the identified closest node in the original route to the concerned DHO enabled node and back. If the added delays also are equal, the RNC is arranged to arbitrarily choose between the concerned DHO nodes.

Returning now to the DHO node selection example based on the example scenario in FIG. 5, the DHO nodes corresponding to the identified branching nodes will be selected as follows. Since symmetric generic cost metrics are used in this example, the cost metric is accumulated in only a single direction between a branching node and a potential DHO node. The DHO node corresponding to branching node R7 is NB4, for which the accumulated generic cost metrics from R7 is 4. All the other DHO enabled nodes in the route tree have greater accumulated generic cost metrics from this branching node. Similarly, the selected DHO node corresponding to the branching node R5 is NB3, for which the accumulated generic cost metrics from R5 is 4. The selected DHO node corresponding to the branching node R4 is NB3 again, for which the accumulated generic cost metrics from R5 is 7. The selected DHO node corresponding to the branching node R2 is NB1, for which the accumulated generic cost metrics from R2 is 1.

Figure 8:
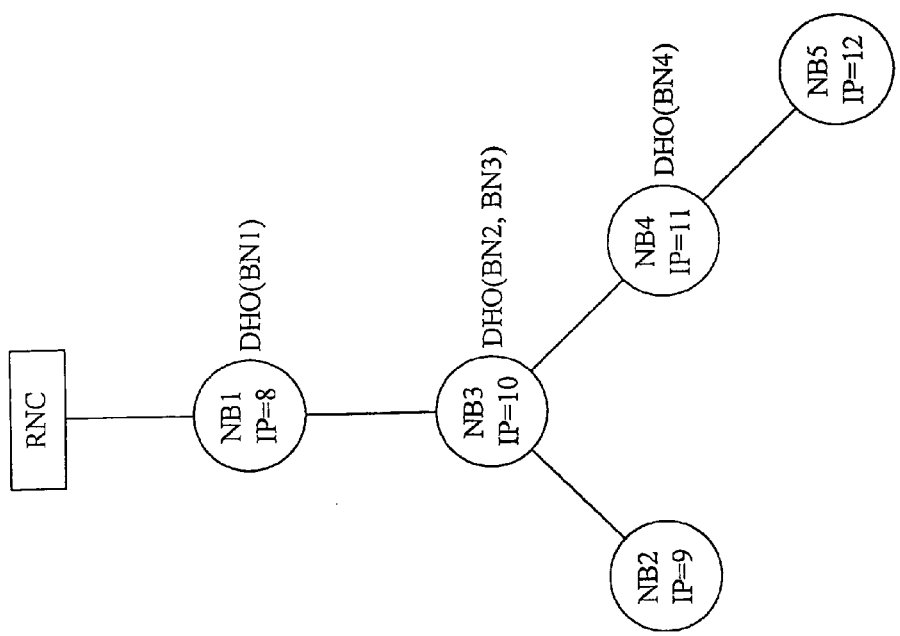
FIG. 8 shows a DHO node tree resulting from selection of DHO nodes corresponding to the branching nodes of the example depicted in FIG. 5.

When the DHO node corresponding to each branching node has been selected, the selected DHO nodes are (logically) interconnected in the same way as their corresponding branching nodes (i.e. as indicated in the simplified schematic tree of branching nodes, Node Bs and the RNC) into a tree of DHO nodes, Node Bs (which are the leaf nodes of the tree) and the RNC. This tree is denoted "DHO node tree". A DHO node may coincide with a Node B, an RNC or another DHO node. In such case the logical connection between the coinciding nodes disappear in the DHO node tree. Like the route tree and the branching node tree, this DHO node tree is a logical construction in the RNC without physical realization in the UTRAN. Table 3 and table 4 illustrate how the branching node tree table of the DHO node selection example, i.e. the branching node tree table of table 2, may be translated into a DHO node tree table. It should be noted that DHO(BNX) represents the selected DHO node corresponding to the branching node X. FIG. 8 illustrates the resulting DHO node tree (as a part of the DHO node selection example based on the example scenario in FIG. 5).

TABLE 3

| DHO node | IP address | Uplink connection | Downlink connections |
|---|---|---|---|
| DHO(BN1) | 8 | RNC | DHO(BN2), IP = 10<br>NB1, IP = 8 |
| DHO(BN2) | 10 | DHO(BN1), IP = 8 | DHO(BN3), IP = 10<br>DHO(BN4), IP = 11 |
| DHO(BN3) | 10 | DHO(BN2), IP = 10 | NB2, IP = 9<br>NB3, IP = 10 |
| DHO(BN4) | 11 | DHO(BN2), IP = 10 | NB4, IP = 11<br>NB5, IP = 12 |

From table 3 it can be concluded that DHO(BN2) and DHO(BN3) are one and the same node, i.e. NB3.

TABLE 4

| DHO node | IP address (and node name) | Uplink connection | Downlink connection |
|---|---|---|---|
| DHO(BN1) | 8 (NB1) | RNC | DHO(BN2)<br>IP = 10<br>(BN1 radio i/f) |
| DHO(BN2, BN3) | 10 (NB3) | DHO(BN1), | DHO(BN4)<br>IP = 8 | IP = 11<br>NB2, IP = 9<br>(NB3 radio i/f) |
| DHO(BN4) | 11 (NB4) | DHO(BN2, BN3), IP = 10 | NB5, IP = 12<br>(NB4 radio i/f) |

Table 4 is the final DHO node tree table derived from the branching node tree table of table 2 (which is a part of the DHO node selection example based on the example scenario in FIG. 5). DHO(BN2) and DHO(BN3) have now been merged into a single DHO node, DHO(BN2,BN3).

FIG. 8 shows the DHO node tree resulting from the selection of DHO nodes corresponding to the branching nodes of the DHO node selection example based on the example scenario in FIG. 5. A data representation of the DHO node tree can be found in table 4.

Checking that the Maximum Allowed Delay is Not Exceeded (also Referred to as the Delay Reduction Phase)

Figure 9:
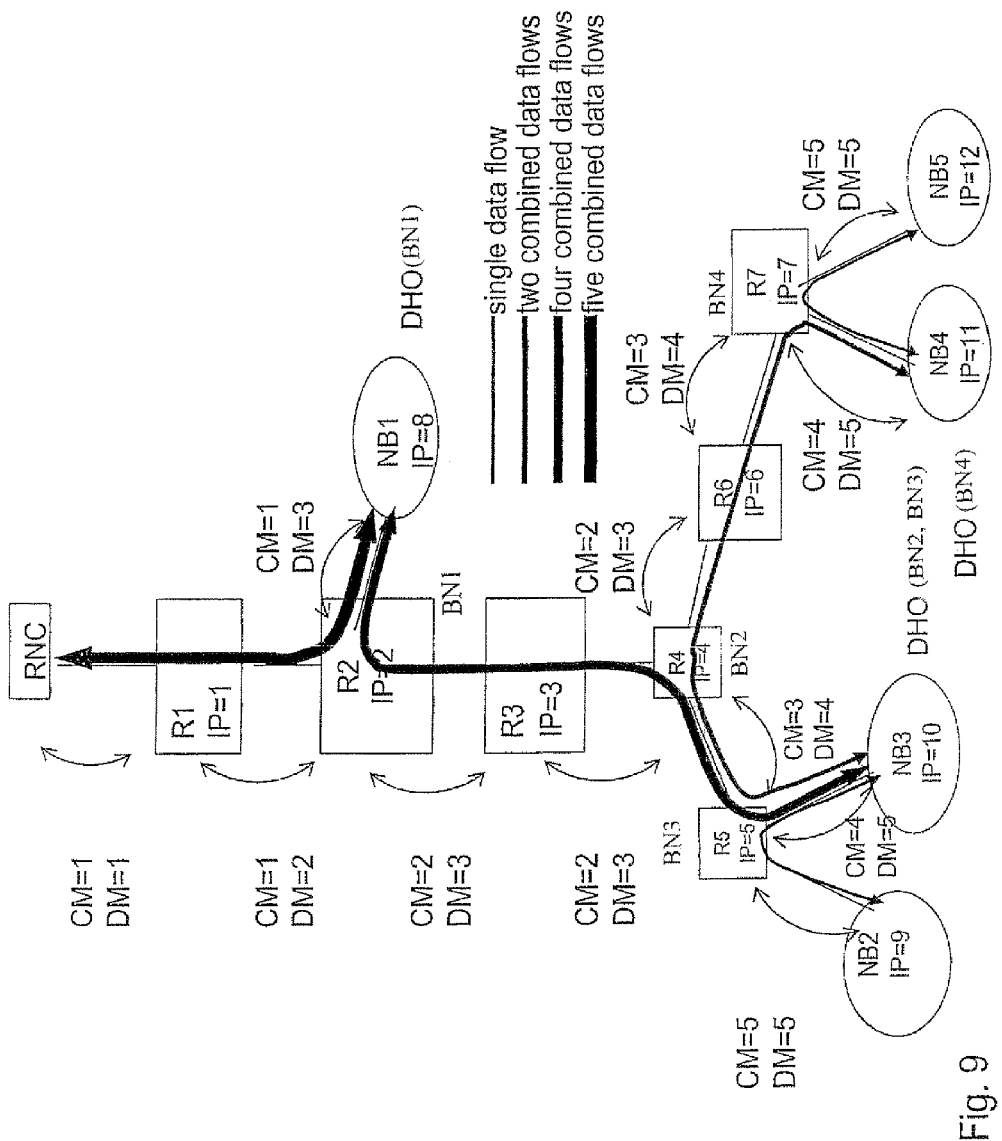
FIG. 9 shows the DHO node tree of FIG. 8 mapped on the route tree of FIG. 6 with the resulting potential data flows.

When the DHO nodes are selected, the last step before instructing the UTRAN nodes to establish the route tree including the selected DHO nodes is to check that the maximum allowed transport delay between a Node B and the RNC is not exceeded. To do this, the connections in the DHO node tree are mapped onto the original route tree to form complete hop-by-hop routes. FIG. 9 illustrates this for the DHO node selection example based on the example scenario in FIG. 5, i.e. the DHO node tree of FIG. 8 is mapped on the route tree of FIG. 6. The resulting data flows are shown with the thicker arrows in FIG. 9.

The RNC analyzes and adds the hop-by-hop delay, which is a part of the topology information for each Node B-RNC path, together to a complete transport delay for the new data path in both directions. For the uplink a default delay value for the frame combining procedure is also added by the RNC for each DHO node in the path except the first one.

The delay calculated from the topology database may not be accurate enough, but may still be used for relative delay measurements. Combining the relative delay measurements (using the delay metrics of the topology database) with the more accurate Node Synchronisation measurements the result should be accurate enough. The Node Synchronization measurements are further described in 3GPP TS 25.402 V5.1.0, "3$^{rd}$ Generation Partnership Project; Technical Specification Group Radio Access Network; Synchronisation in UTRAN Stage 2 (Release 5)" and in 3GPP TS 25.427 V5.0.0, "3$^{rd}$ Generation Partnership Project; Technical Specification Group Radio Access Network; UTRAN Iub/Iur interface user plane protocol for DCH data streams (Release 5)".

The Node Synchronisation procedure, which is a part of the DCH Frame Protocol (and other UTRAN user plane protocols), measures accurately the round trip delay from the RNC to a Node B and back. For increased stability and accuracy the Node Synchronisation procedure may optionally be carried over dedicated high priority bearers. The Node Synchronisation procedure may be executed at any time, but in principle it should only have to be executed when the topology of the transport network has changed. The Node Synchronisation procedure is performed between the RNC and one or more Node Bs. The RNC sends a downlink Node Synchronisation control frame to one or more Node Bs (if the control frame is sent in the user plane of a DCH in soft handover mode, the control frame is subject to splitting and will reach all the involved Node Bs). The downlink Node Synchronisation control frame contains certain time parameters. Each Node B that receives a downlink Node Synchronisation control frame responds with an uplink Node Synchronisation control frame containing certain time parameters. A reasonable alternative could be to execute the Node Synchronisation procedure every time a corresponding set of traceroute measurements has been carried out (when traceroute measurements are used). In the calculations combining the relative delay measurements (using the delay metrics of the topology database) with Node Synchronisation delay measurements the following notation is used:

| | |
|---|---|
| $D_{NS}$ | The delay measured with the Node Synchronisation procedure. |
| $D_{top-old-DL}$ | The downlink transport delay of the original path (i.e. the route retrieved from the topology database) calculated from the topology database. |
| $D_{top-old-UL}$ | The uplink transport delay of the original path calculated from the topology database. |
| $D_{top-new-DL}$ | The downlink delay of the new path calculated from the topology database. |
| $D_{top-new-UL}$ | The uplink delay of the new path calculated from the topology database. |
| $N_{DHO}$ | The number of DHO nodes in the data path (including the RNC if the RNC is one of the selected DHO nodes). |
| $D_{comb}$ | The default delay value for frame combining. This value may depend on the number of frames that are combined, but henceforth it is assumed that the parameter has a fixed value that is independent of the number of combined frames. |
| $D_{new-path-DL}$ | The estimated downlink delay of the new path as a result of combining the measurements based on the topology database and the Node Synchronisation measurements. |
| $D_{new-path-UL}$ | The estimated uplink delay of the new path as a result of combining the measurements based on the topology database and the Node Synchronisation measurements. |

By combining the different delay parameters reasonably accurate values of the downlink and uplink delays of the new path may be calculated as follows:

$$D_{top-old-DL} = \Sigma(\text{downlink hop delays of old path})$$

$$D_{top-old-UL} = \Sigma(\text{uplink hop delays of old path})$$

$$D_{top-new-DL} = \Sigma(\text{downlink hop delays of new path})$$

$$D_{top-new-UL} = (N_{DHO}-1) \times D_{comb} + \Sigma(\text{uplink hop delays of new path})$$

$$\Rightarrow$$

$$D_{new-path-DL} = (D_{top-new-DL}/D_{top-old-DL}) \times D_{NS}$$

$$D_{new-path-UL} = (D_{top-new-UL}/D_{top-old-UL}) \times D_{NS}$$

If symmetric delay metrics are used the calculations are slightly simplified. The delay values that should be compared with the maximum allowed delay are the values of $D_{new-path-DL}$ and $D_{new-path-UL}$. This means that if the measurements based on the topology data are somewhat inaccurate, the maximum allowed value of the $D_{top-new-DL}$ and $D_{top-new-UL}$ parameters may be different for different data paths. For instance, a certain $D_{top-new-DL}$ for one data path may cause the $D_{new-path-DL}$ value to exceed the maximum allowed value, whereas the same $D_{top-new-DL}$ value for another data path may result in a $D_{new-path-DL}$ value within the allowed range.

If either $D_{new-path-DL}$ or $D_{new-path-UL}$ exceeds the maximum allowed delay in the transport network (or a slightly lower delay threshold to provide a safety margin), the concerned path must be changed. There are different ways to do this with different levels of complexity (and performance). Ideally the DHO node selection should be restarted with new conditions to arrive at a new result, possibly with entirely or partly new DHO nodes. The goal should be to achieve data paths with acceptable delays with as small increase as possible in the overall accumulated cost metrics compared to the first DHO node tree. However, another important goal is to keep the algorithm simple and computation efficient. Therefore the DHO node selection is preferably not restarted. Instead the concerned data path is modified in order to decrease its delay down to an acceptable level.

The way to modify the data path is to remove one or more DHO nodes from the path, until the path delay is smaller than the maximum allowed value. By removal of a DHO node from a path is meant that the concerned data flow bypasses the DHO node. The removed DHO node may remain in the path (if it is included in the original route of the Node B of the path), but its DHO functionality is not applied to the concerned data flow. If the data flow had to make a detour to reach the DHO node, the DHO node will not remain in the path after its removal.

Which DHO node(s) should be removed? There are several methods for stepwise removal of DHO nodes in a path. They differ in complexity and efficiency. In all but the last method (which is fundamentally different from the others) the required path delay reduction (calculated in the route tree using data from the topology database) may preferably be calculated before the path delay reduction method is started.

If the downlink path delay is too large, the required downlink delay reduction (in terms of delay metrics) is $D_{red-DL} = D_{top-new-DL} - D_{max} \times D_{top-old-DL}/D_{NS}$, where $D_{red-DL}$ is the required downlink delay reduction and $D_{max}$ is the maximum allowed delay. If the uplink path delay is too large, the required uplink delay reduction (in terms of delay metrics) is $D_{red-UL} = D_{top-new-UL} - D_{max} \times D_{top-old-UL}/D_{NS}$, where $D_{red-UL}$ is the required uplink delay reduction.

To calculate the potential path delay reduction the RNC first identifies the node that is the closest to the concerned DHO node out of the nodes in the original route (i.e. the route retrieved from the topology database) of the RNC-Node B path (or Node B-RNC path) whose delay is to be reduced. This may be a branching node (in the original route tree), but it may also be the DHO node itself (which may or may not be a branching node). The potential downlink path delay reduction (in terms of delay metrics) is calculated as the accumulated hop-by-hop delay metrics in the roundtrip from the identified closest node (in the original route) to the DHO node and back to the identified closest node again. The potential uplink path delay reduction is calculated in the same way with the addition of a frame combining delay, unless the DHO node is the hierarchically highest DHO node in the path.

The calculation of the potential cost increase is more complicated. There are four different cases to consider:
1. Before its removal, the DHO node applied its splitting and combining functionality to three or more data flows which means that after the removal the DHO node will still apply its DHO functionality to at least two data flows.
2. Before its removal, the DHO node applied its splitting and combining functionality to two data flows which means that after the removal the DHO node will not apply its DHO functionality to any data flow. The DHO node is included in one and only one of the original routes i.e. the optimal routes in the route tree of the two concerned data flows.
3. Before its removal, the DHO node applied its splitting and combining functionality to two data flows which means that after the removal the DHO node will not apply its DHO functionality to any data flow. The DHO node is included in the original routes (i.e. the optimal routes in the route tree) of both the concerned data flows.

4. Before its removal, the DHO node applied its splitting and combining functionality to two data flows which means that after the removal the DHO node will not apply its DHO functionality to any data flow. The DHO node is not included in the original route (i.e. the optimal route in the route tree) of any of the concerned data flows.

There are different delay reduction methods adapted to be implemented in the RNC. An example of one possible method is explained below:

In this method, the RNC removes the first DHO node in the path in the direction from the Node B to the RNC, excluding DHO nodes that are included in the original RNC-Node B route retrieved from the topology database. The resulting delay reduction is calculated and if it is not enough, the method is repeated for the modified path. If it is only the uplink path delay that needs reduction and there is no DHO node in the path that is not included in the original route, then a DHO node that is included in the original route (except the RNC) may be removed in order to reduce the uplink path delay by the frame combining delay.

Then the formation of the route tree, the identification of the branching nodes and their relative interconnections are performed in the same way as described above. The subsequent step, i.e. the actual selection of the best DHO node corresponding to each branching node, is, however, enhanced in that the delay metrics are considered in addition to the generic cost metrics.

When the RNC calculates the accumulated hop-by-hop generic cost metrics from a certain branching node to the DHO enabled nodes in the route tree, it also keeps track of the hop-by-hop delay metrics. When the DHO enabled node with the smallest accumulated generic cost metrics (measured from the branching node) is found, the RNC checks that the resulting added delay for each affected route (in each direction) is not greater than the remaining delay metrics margin to the maximum delay. The affected routes are those (original routes) that pass through the concerned branching node. The added delay in the downlink direction for a route is calculated as the accumulated hop-by-hop delay metrics roundtrip from the tentatively selected DHO node to the closest node that is included in the concerned route and back. The added delay in the uplink direction is calculated in the same way with the addition of a frame combining delay, unless this is the first DHO node to be selected for the concerned route (in which case no frame combining delay is added).

To integrate the calculation of the added delay with the cost metrics accumulation the RNC is arranged to do as follows. In its search for the best DHO enabled node corresponding to a certain branching node, each time the RNC "steps" away from a branching node (including the concerned branching node) where at least one of the affected routes divert from path that the RNC is "stepping" in the route tree, the RNC starts to accumulate the hop-by-hop delay metrics (in both directions) and continues to do so all the way to the DHO enabled node. Subsequently, when the RNC has tentatively selected a DHO node corresponding to the concerned branching node, the RNC has already (during the "stepping" process) calculated the accumulated hop-by-hop delay metrics roundtrip from the tentatively selected DHO node to the closest node included in each of the affected routes. Thus, the RNC is arranged to immediately check whether the remaining delay margin would be exceeded for any of the affected routes, if the tentatively selected DHO node were to be finally selected.

The RNC may also combine the (possibly somewhat inaccurate) delay metrics from the topology database with the more accurate delay measurement results from the Node Synchronisation procedure (similar to what is described above) in order to calculate more accurate delay margins. The initial delay margins (measured in terms of delay metrics from the topology database) for the downlink and the uplink could then be calculated as follows:

$$D_{marg\text{-}DL} = D_{top\text{-}old\text{-}DL} \times (D_{max}/D_{NS} - 1)$$

$$D_{marg\text{-}UL} = D_{top\text{-}old\text{-}UL} \times (D_{max}/D_{NS} - 1)$$

where $D_{marg\text{-}DL}$ and $D_{marg\text{-}UL}$ are the delay margins for the downlink and uplink respectively, $D_{max}$ is the maximum allowed delay and $D_{top\text{-}old\text{-}DL}$, $D_{top\text{-}old\text{-}UL}$ and $D_{NS}$ are the same as previously defined.

In order for this DHO node selection process with integrated delay checks to work well the RNC should start the DHO node selection process with the branching nodes in the lowest layer of the branching node hierarchy and continue with the branching nodes of the next hierarchical layer etc.

The consequences of the integrated delay checks for a tentatively selected DHO node can be divided into three different cases, depending on the number of the affected routes for which the remaining delay margin is not exceeded.

If the remaining delay margin is not exceeded for any of the affected routes, the RNC can safely select the DHO node. The RNC then reduces the remaining delay margin for the affected routes with their respective added delays and continues the DHO node selection process with the next branching node (if any).

If the remaining delay margin for one or more of the affected routes is exceeded, but there are at least two affected routes for which the remaining delay margin is not exceeded, then the DHO node can be selected for those of the affected routes that passed the delay check, but not for the other(s). The RNC then notes that the data paths of the macro diversity legs whose routes did not pass the delay check should bypass the selected DHO node. This note should make sure that this circumstance is reflected in the subsequently created DHO node tree. Finally the RNC reduces the remaining delay margin for the affected routes that passed the delay check with their respective added delays and continues the DHO node selection process with the next branching node (if any).

If the remaining delay margin for one or more of the affected routes is exceeded and only one or none of the affected routes passed the delay check, then no DHO node at all is selected for the concerned branching node. In this situation it would be possible for the RNC to check whether the second best DHO enabled node (or any other potential DHO node) could be selected, but the probability of finding one for which at least two of the affected routes pass the delay check is very low. Hence, in order not to complicate the DHO node selection process further the RNC might as well accept that no DHO node is selected for this branching node. The RNC notes this and makes sure that it is reflected in the subsequently created DHO node tree. The RNC then continues the DHO node selection process with the next branching node (if any).

Returning again to the DHO node selection example based on the example scenario in FIG. 5, which now continues with the delay reduction phase. The previously exemplified delay reduction method will be applied in this example.

First it is assumed that the delay reduction method is applied with a default frame combining delay value of 3. As previously mentioned the maximum allowed value of the delay measurement value based on the topology data (i.e. the delay metrics in the route tree) can differ between different data paths, because the delay metrics in the topology database may be somewhat inaccurate. However, in this example it is assumed that the maximum allowed accumulated delay metrics is 45 for all the data paths.

As can be derived from FIG. 9 the data path of NB1 has a downlink delay of 6 and the same value for the uplink delay. The data path of NB2 has a downlink delay of 34 and an uplink delay of 37. The data path of NB3 has a downlink delay of 24 and an uplink delay of 27. The data path of NB4 has a downlink delay of 45 and an uplink delay of 51. The data path of NB5 has a downlink delay of 55 and an uplink delay of 61.

Consequently the uplink delay for the data path of NB5 must be reduced by at least 61−45=16 and its downlink delay must be reduced by at least 55−45=10. Similarly the uplink delay for the data path of NB4 must be reduced by at least 51−45=6.

Figure 10:
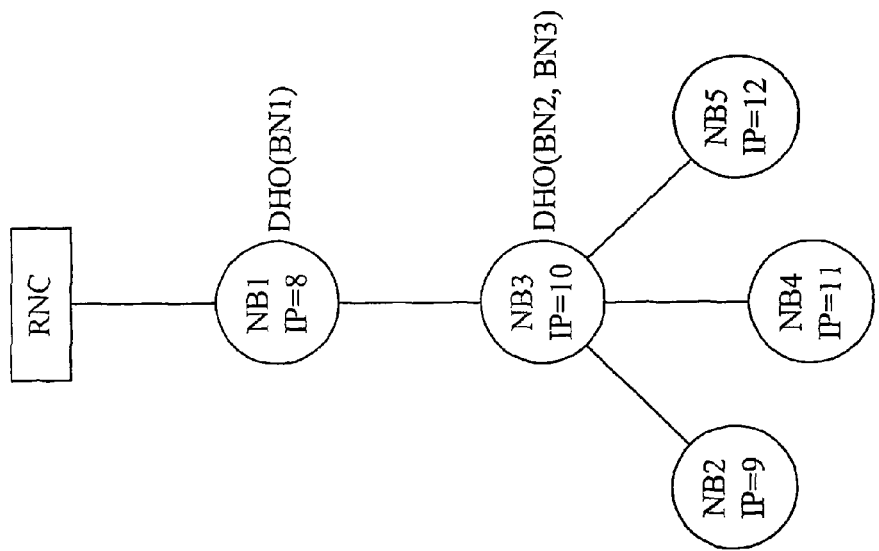
FIG. 10 shows a non-limiting example of a modified DHO node tree after the first step of the delay reduction method number 5.
Figure 11:
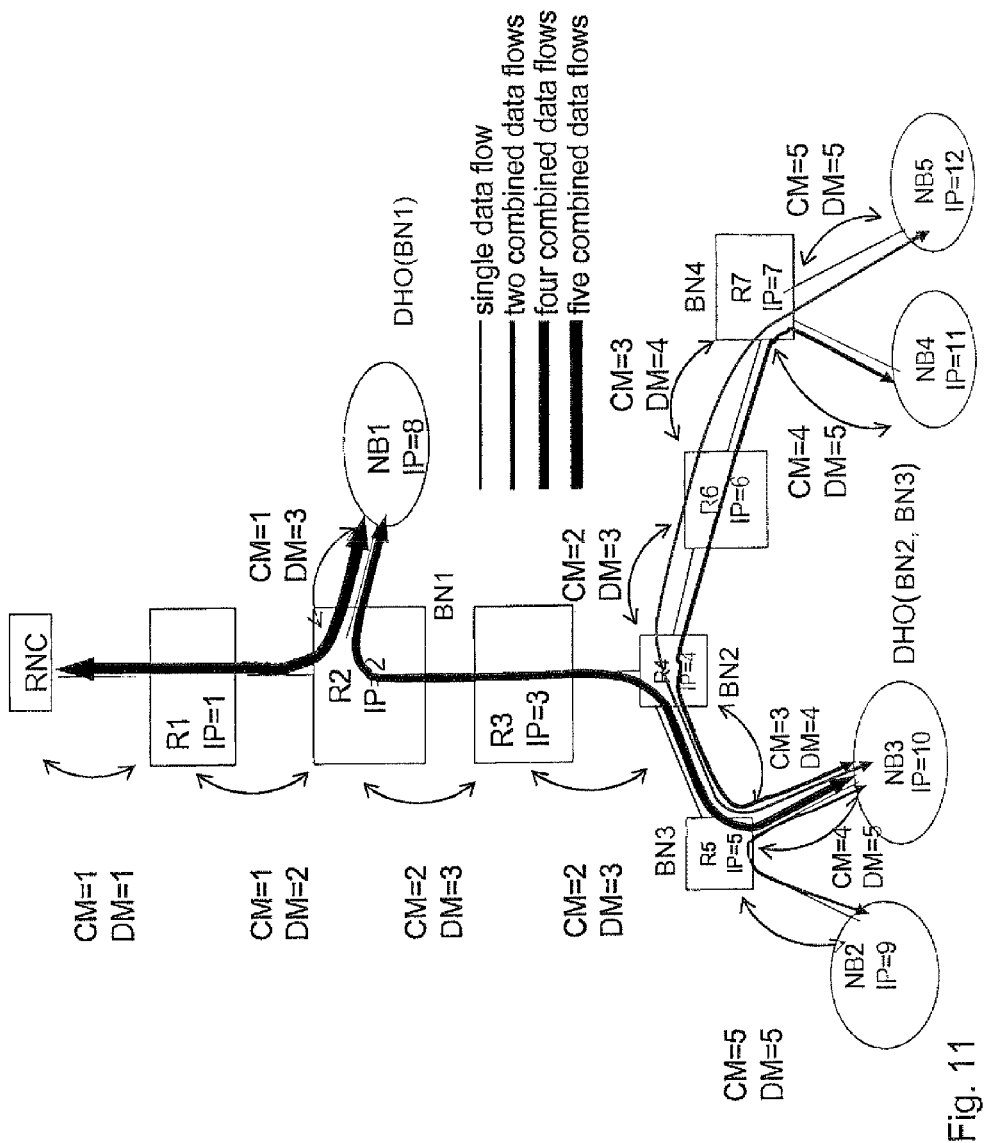
FIG. 11 shows the potential data flows in the route tree after the first step of the delay reduction method number 5.

The delay reduction method starts with the data path with the greatest delay reduction needs, i.e. the data path of NB5 in this example. According to the delay reduction method, the first DHO node in the path in the direction from the Node B to the RNC should be removed first (excluding DHO nodes that are included in the original RNC-Node B route retrieved from the topology database). This means that DHO node NB4 is removed from the data path of NB5 in the first step. The resulting modified DHO node tree table and DHO node tree are shown in table 5 and FIG. 10. The resulting potential data flows in the route tree are depicted in FIG. 11.

TABLE 5

The modified DHO node tree table after the first step of the delay reduction method.

| DHO node | IP address (and node name) | Uplink connection | Downlink connection |
| --- | --- | --- | --- |
| DHO(BN1) | 8 (NB1) | RNC | DHO(BN2), IP = 10 (BN1 radio i/f) |
| DHO(BN2, BN3) | 10 (NB3) | DHO(BN1), IP = 8 | NB2, IP = 9 NB4, IP = 11 NB5, IP = 12 (NB3 radio i/f) |

Figure 12:
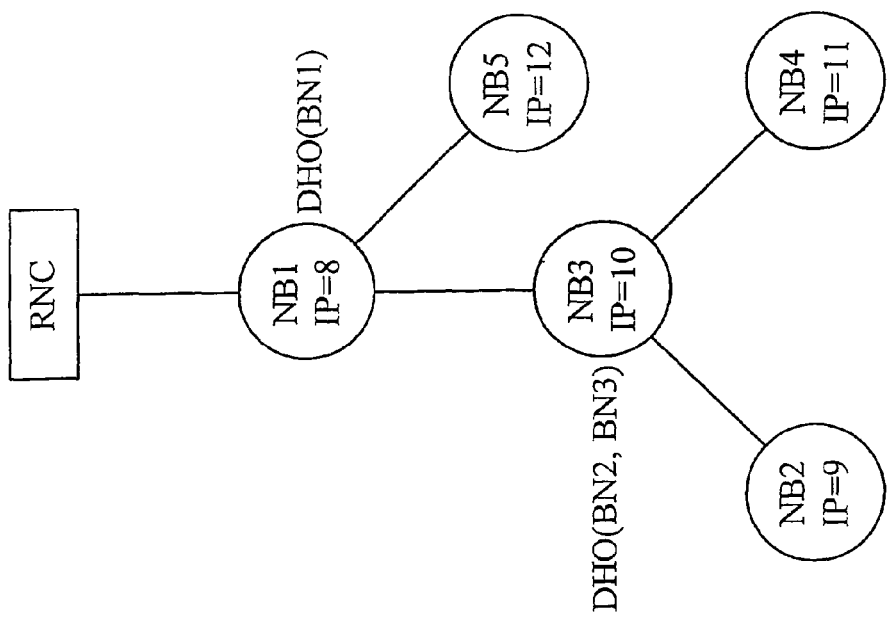
FIG. 12 shows the modified DHO node tree after the second step of the delay reduction method number 5.
Figure 13:
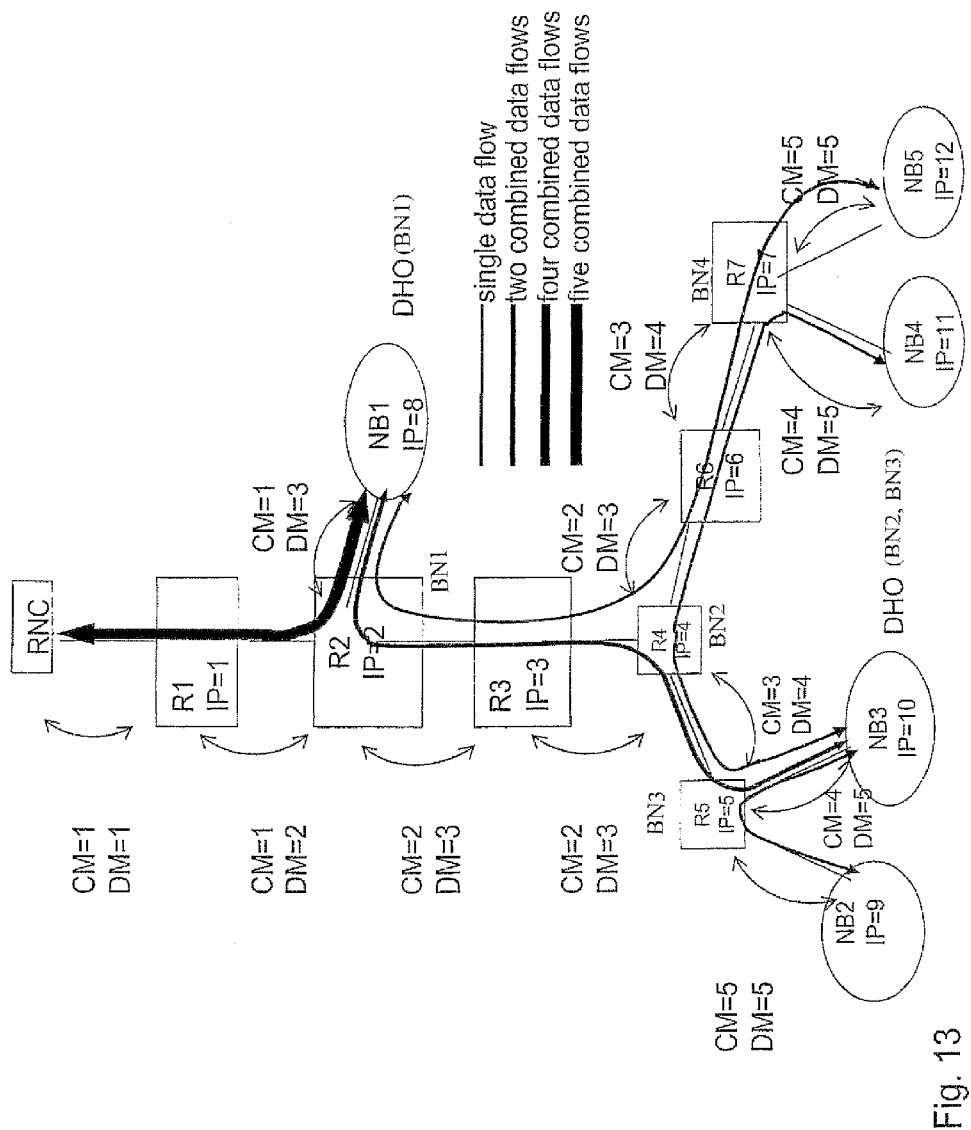
FIG. 13 shows the potential data flows in the route tree after the second step of the delay reduction method number 5.

This first step reduced the uplink delay of the data path of NB5 by 13 and the downlink delay by 10. This is enough for the downlink delay, but the uplink delay has to be reduced by another 3 units. Thus, according to the delay reduction method number 5 the next DHO node in the Node B to RNC direction of the data path of NB5 is removed. This means that the DHO node NB3 is removed from the data path of NB5 in the second step. The resulting modified DHO node tree table after the second step of the delay reduction method is shown in table 6 and the DHO node tree is shown in FIG. 12. The resulting potential data flows in the route tree are depicted in FIG. 13.

TABLE 6

| DHO node | IP address (and node name) | Uplink connection | Downlink connection |
| --- | --- | --- | --- |
| DHO(BN1) | 8 (NB1) | RNC | DHO(BN2), IP = 10 NB5, IP = 12 (BN1 radio i/f) |
| DHO(BN2, BN3) | 10 (NB3) | DHO(BN1), IP = 8 | NB2, IP = 9 NB4, IP = 11 (NB3 radio i/f) |

Figure 14:
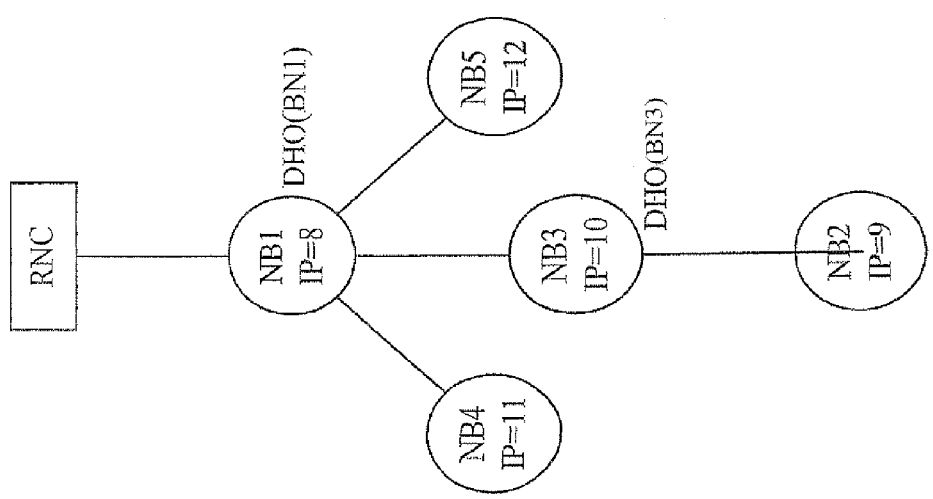
FIG. 14 shows the modified DHO node tree after the third step of the delay reduction method number 5.
Figure 15:
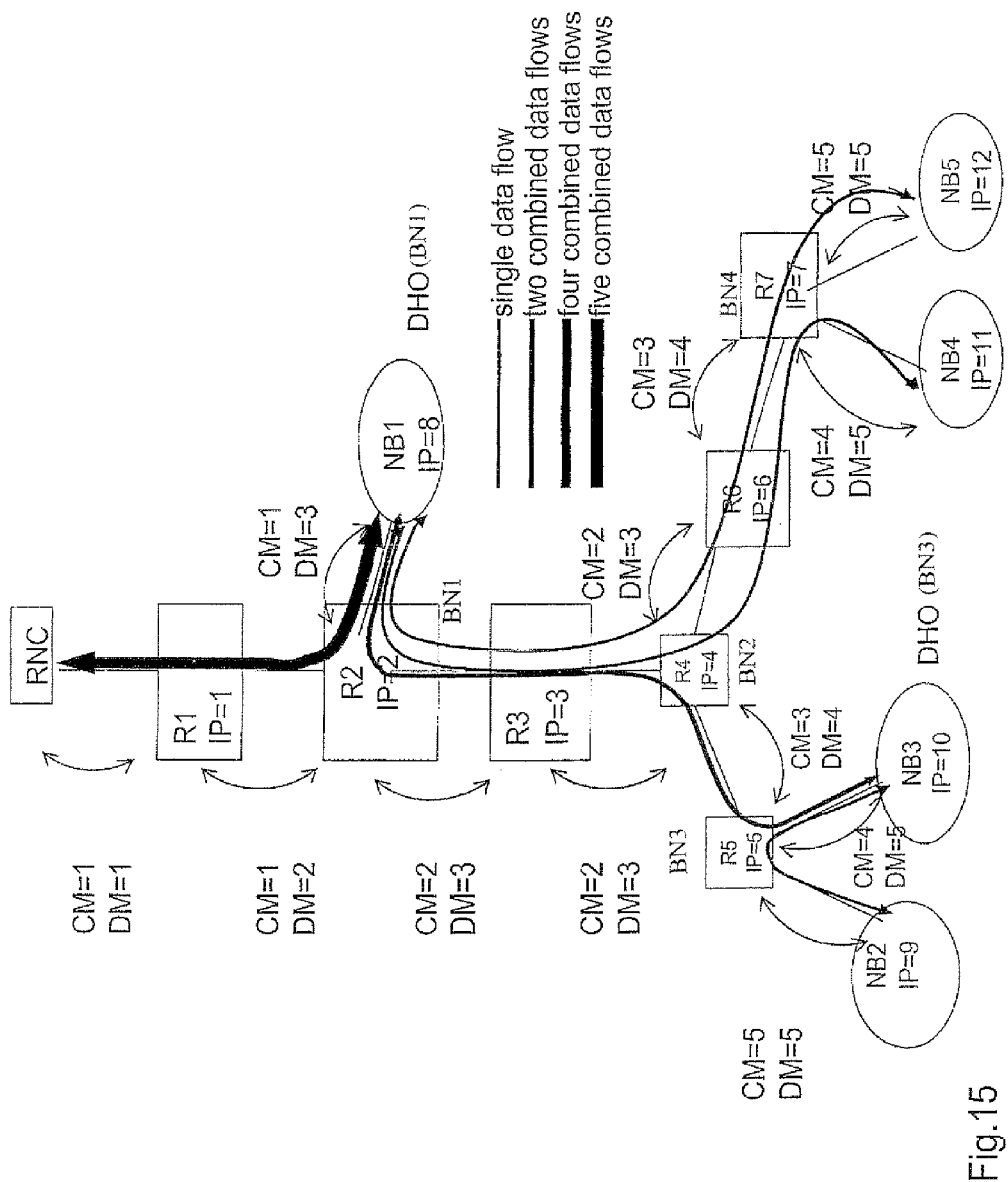
FIG. 15 shows the potential data flows in the route tree after the third step of the delay reduction method number 5.

The second step reduced the uplink delay of the data path of NB5 by 21 (and the downlink delay by 18). This is enough and the delay reduction for the path of NB5 is thereby finalized. Then the delay reduction method may be applied to the data path of NB4. As previously stated, the uplink delay of the data path of NB4 must be reduced by 6 units whereas the downlink delay needs no reduction. However, the removal of NB4 as a DHO node of the data path of NB5 means that NB4 no longer acts as a DHO node for the data path of NB4 either. Consequently, the uplink delay of the data path of NB4 has already been reduced by 3 units. Remaining to be reduced are another 3 units. According to the delay reduction method, the first DHO node in the Node B to RNC direction should be removed from the data path of NB4. Thus, in the third step the DHO node NB3 is removed from the data path of NB4. The resulting modified DHO node tree table and DHO node tree after the third step of the delay reduction method are shown in table 7 and FIG. 14. The resulting potential data flows in the route tree are depicted in FIG. 15.

TABLE 7

| DHO node | IP address (and node name) | Uplink connection | Downlink connections |
| --- | --- | --- | --- |
| DHO(BN1) | 8 (NB1) | RNC | DHO(BN2), IP = 10 NB4, IP = 11 NB5, IP = 12 (BN1 radio i/f) |
| DHO(BN2, BN3) | 10 (NB3) | DHO(BN1), IP = 8 | NB2, IP = 9 (NB3 radio i/f) |

Thus the third step reduced the uplink delay of the data path of NB4 by 21 (and the downlink delay by 18). This is enough and consequently the delay reduction for the entire DCH i.e. for all data paths is thereby finalized.

The final DHO node tree is then the basis for instructions to the selected DHO nodes and the establishment of transport bearers.

Realization of a DHO Node Tree

When the DHO nodes, also referred to as macro diversity nodes, are selected e.g. according to the above described method, the RNC instructs the DHO nodes and other affected nodes so that the intended macro diversity is established. DHO nodes receive instructions from the RNC by means of NBAP or RNSAP (in the inter-RNS case) and perform the following in accordance with said instructions according to one or more non-limiting embodiments.

For the Downlink:

The DHO nodes are adapted to split the downlink flow and to forward the resulting flows according to the instructions received from the RNC using the transport bearers previously established according to the instructions received from the RNC. The instructions to direct the data flows between the involved nodes may comprise IP addresses and UDP ports in an IP-based UTRAN or ATM addresses and SUGR (Served User Generated Reference) references in an ATM-based UTRAN.

When unmodified NBAP and RNSAP is used the DHO nodes may be adapted to split the downlink flow and to forward the resulting flows according to implicit information in the uplink data flow received from hierarchically lower nodes. This implicit information can include source IP addresses and UDP ports retrieved from the IP header and UDP header of received uplink packets.

For the Uplink:

The DHO nodes are adapted to combine the uplink flows to a single uplink flow that is forwarded according to the instructions received from the RNC using a previously established transport bearer. The instructions may comprise IP addresses in an IP-based UTRAN or ATM addresses and SUGR parameters in an ATM based UTRAN. When unmodified NBAP and RNSAP are used the DHO nodes can be adapted to identify the uplink flows to be combined through information retrieved from uplink packets received from hierarchically lower nodes.

The Node Bs with DHO functionality preferably use an adaptive timing scheme to optimise the trade-off between delay and frame loss in the uplink combining.

This procedure is further described below.

It should be understood that the method using instructions or other means to establish the macro diversity in accordance with the (logical) DHO node tree is independent of the method that is disclosed to obtain or create the (logical) DHO node tree. Any other method to create the (logical) DHO node tree (i.e. to select the DHO nodes) can be used.

If a transport network control plane protocol is used, the selected Node Bs with DHO functionality may use this control plane protocol to establish the inter-Node B transport bearers according to the instructions from the RNC. Examples of such transport network control plane protocols include, among others, Q.2630 (for AAL2 connections) in an ATM based UTRAN and the control plane protocol being developed by the NSIS (Next Step In Signaling) workgroup in the IETF (Internet Engineering Task Force) in an IP based UTRAN.

To establish a hierarchical macro diversity structure the selected DHO nodes should be instructed so that they know where to send split downlink flows and what uplink flows to combine. These DHO node instructions can be based on the DHO node tree that is the outcome of the DHO node selection process. Every time the DHO node tree changes (due to addition or removal of macro diversity legs) some or all the affected nodes (both DHO nodes and non-DHO Node Bs) need new instructions. Changed instructions may also be needed when DCHs are added or removed from all macro diversity legs. DHO nodes may also need QoS instructions when DCHs are modified in a way that the QoS of their transport bearers have to be changed. The affected nodes may range from a single to all Node Bs in the DHO node tree. No signaling is required when only the S-RNC is affected.

Realizing a DHO Node Tree with Modified Protocols

In order to direct the DCH data flows in accordance with the DHO node tree the RNC can provide the involved Node Bs with the IP addresses and UDP ports (in an IP UTRAN) or ATM addresses and SUGR parameters (in an ATM UTRAN) that they need to establish the inter-Node B transport bearers. If a transport network control plane protocol is used, the Node Bs handle can this transport network control plane signaling between themselves and intermediate routers or AAL2 switches for inter-Node B transport bearers.

To direct a transport bearer between a DHO node or a leaf Node B (in the DHO node tree) and a hierarchically higher DHO node or the RNC in an IP UTRAN without using the transport layer control plane protocol, the RNC conveys to the DHO node or leaf Node B the destination IP address and UDP port to be used in the uplink direction of the transport bearer. That is, in essence, unless the hierarchically higher node is the RNC itself, the RNC replaces an IP address and a UDP port of the RNC (that would have been included in the message if distributed macro diversity had not been used) by an IP address and a UDP port of the hierarchically higher DHO node. The receiving node returns the destination IP address and UDP port to be used in the downlink direction of the transport bearer.

In an ATM UTRAN or an IP UTRAN with a transport layer control plane protocol no address (i.e. ATM address or IP address) or transport bearer reference (i.e. SUGR parameter or UDP port) has to be conveyed to a DHO node or leaf Node B to direct a transport bearer between the DHO node or leaf Node B and a hierarchically higher DHO node or the RNC. In these cases the transport bearer is established from the hierarchically higher node (i.e. a DHO node or the RNC) and the hierarchically lower node does not have to know the destination parameters of the uplink direction of the transport bearer in advance. However, the hierarchically lower node has to be prepared in advance for the coming transport bearer establishment and it has to allocate destination parameters (ATM address and SUGR parameter or IP address and UDP port) for the downlink direction of the transport bearer to be used when the transport bearer is established. These parameters are returned to the RNC in response to the message that prepares the hierarchically lower node for the coming transport bearer establishment from a hierarchically higher node.

To direct a transport bearer between a DHO node and a hierarchically lower DHO node or leaf Node B (in the DHO node tree) in any type of UTRAN (i.e. an ATM UTRAN or an IP UTRAN with or without a transport layer control plane protocol), the RNC conveys to the DHO node the destination parameters (i.e. ATM address and SUGR parameter or IP address and UDP port) for the downlink direction of the transport bearers. This is information that is not included in regular NBAP (or RNSAP) messages. The RNC had previously retrieved these destination parameters from the hierarchically lower DHO node or leaf Node B, when this hierarchically lower node was prepared for or received direction for the establishment of the transport bearer towards the hierarchically higher node.

Note that when a node establishes a transport bearer towards a hierarchically lower node, this transport bearer is from the viewpoint of the hierarchically lower node a transport bearer towards a hierarchically higher node.

Along with the transport bearer direction information the RNC may also send explicit QoS information to be used for the inter-Node B transport bearers. This may be e.g. in the form of DiffServ code points, QoS class indications or bandwidth and possibly delay indications. Other instructions may be timing instructions for the uplink combining function and time indications for activation of the DHO instructions. However, the required QoS information may also be implicitly derived from the DCH characteristics signaled via NBAP (and possibly RNSAP). Yet a possibility is to copy the QoS class used for the transport bearers towards the hierarchically higher node (in the DHO node tree) for the transport bearers towards the hierarchically lower node(s) (in the DHO node tree).

In some cases a changed DHO node tree implies that several data paths need to be changed in order to form a complete Node B-RNC path for a macro diversity leg. In such cases the RNC may choose to synchronize the switching from old to new data paths at a certain CFN in order to avoid data loss. The RNC then associates with the DHO instructions a time indication (in the form of a CFN) that indicates the CFN when the DHO instructions are to be effectuated in the receiving node.

To convey all these instructions to the involved Node Bs the RNC can use anyone or more of existing unchanged NBAP messages (and RNSAP messages), existing modified NBAP messages (and RNSAP messages) and even new NBAP messages (and RNSAP messages).

One non-limiting aspect of the DHO related signaling is associated with the inter-RNS case. In the inter-RNS case the D-RNC more or less relays the information between the S-RNC and the Node Bs, using RNSAP towards the S-RNC and NBAP towards the Node Bs. It is however not a strict relay, since the D-RNC converts between two protocols.

Since the DHO related information in an RNSAP message sent from the S-RNC to a D-RNC may be intended for any of the Node Bs in the RNS of the D-RNC, there should be a way for the S-RNC to indicate the intended recipient of the DHO related information. The preferred way to do this is to include a transport layer address (i.e. an IP address or an ATM address) of the intended recipient node together with the DHO related information that is included in an RNSAP message. This transport layer address should be the same address as the one that is used to represent the node in the topology information, because this address is the only address of the node that the S-RNC is guaranteed to know. However, if the intended recipient node is the D-RNC, the included transport layer address may be any address of the D-RNC that the S-RNC knows, e.g. the one that is used in the topology information or the one that is used as the destination address for the transport bearer used for the concerned RNSAP message. Likewise a transport layer address may be associated with DHO related information in RNSAP messages sent in response from a D-RNC to a S-RNC.

If inter-RNS DCH transport bearers are always terminated in the D-RNC (which is possible according to the 3GPP standard), then no extension or modification of the RNSAP signaling is needed for the inter-RNS case of distributed DHO functionality. Instead the D-RNC can handle the distributed macro diversity mechanisms (i.e. selection of DHO nodes, providing DHO instructions, etc.) within its own RNS by itself independently of the S-RNC (provided that the S-RNC has not indicated that the D-RNC must not perform DHO functionality for a particular macro diversity leg).

Realizing a DHO Node Tree with Unmodified Protocols

In another non-limiting embodiment the RNC realizes the DHO node tree (i.e. directs the transport bearers in accordance with the DHO node tree) using unmodified NBAP and RNSAP protocols. The regular message formats are used and no new parameters are introduced.

It should be understood that this method to establish the macro diversity in accordance with the (logical) DHO node tree is independent of the method that is used to obtain or create the (logical) DHO node tree.

The embodiment without protocol modifications is more appropriately used in an IP UTRAN without an IP control plane protocol. The reasons for this will be apparent from the further description of the solution.

Using existing unmodified NBAP means that no DHO instructions that require new types of parameters in the NBAP messages may be used. This has consequences for the direction of data flows, the QoS instructions for the inter-Node B transport bearers as well as the initiation of DHO functionality in a Node B. Another consequence is that only radio active Node Bs are arranged to act as DHO nodes. Non-radio active nodes, including D-RNCs (but excluding the S-RNC), are not possible as DHO nodes.

Figure 16:
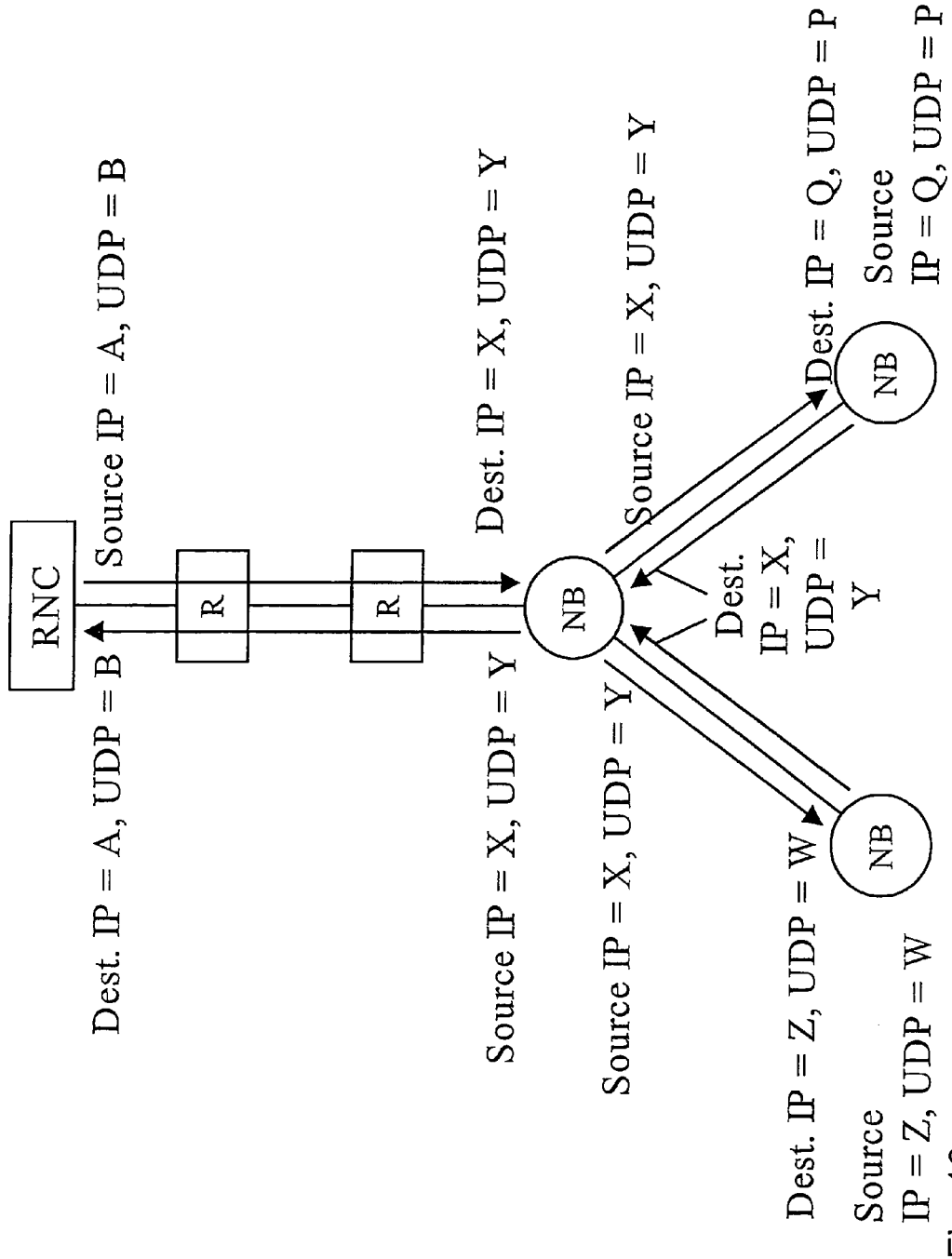
FIG. 16 shows the principles for how IP addresses and UDP ports are used for the flows of a macro diversity tree in an IP UTRAN.

A DHO node in an IP UTRAN allocates the same IP address and UDP port for all transport bearers related to the same DCH. That is, all the received data flows pertaining to the same DCH arrive at the same IP address and UDP port (including the downlink flow from a hierarchically higher node in the DHO node tree as well as uplink flows from hierarchically lower nodes). The DHO node looks at the source IP address of the received IP packets in order to distinguish IP packets from the different flows of the same DCH (e.g. a downlink flow and one or several uplink flows). The DHO node will also use the same IP address and UDP port as source address and source port for the corresponding flows in the opposite directions. A DHO node combines all uplink flows arriving at a certain IP address and UDP port with each other and, if the DHO node is a radio active Node B, with the node's own uplink flow arriving across the radio interface. The DHO node also knows that for each combined uplink flow there should be a corresponding split downlink flow sent to the same IP address and UDP port as the uplink flow uses as source IP address and UDP port. If the DHO node is a radio active Node B, it should of course also send a split downlink flow across the radio interface. See FIG. 16, wherein the principles for how IP addresses and UDP ports are used for the flows of a macro diversity tree in an IP UTRAN. It should be noted that intra-site links and radio interface flows are not shown. This principle is crucial for the solution with unmodified protocols, but it is valid also for the embodiment using modified protocols.

In the description below a hierarchically higher or lower node always refers to the hierarchy of the DHO node tree of a DCH.

As will be seen below the initiation and termination of DHO functionality in a DHO node is tightly coupled with the direction of data flows in this solution.

Existing NBAP messages and parameters allow the RNC to instruct a Node B of the destination IP address and UDP port that should be used in the uplink direction of a DCH transport bearer towards a hierarchically higher node. When the DHO functionality is not distributed, these parameters are an IP address and a UDP port of the RNC itself. NBAP does however not include any means for instructing a Node B of what parameters to use for a transport bearer towards a hierarchically lower node. This is because there is no need for such instructions in a UTRAN without distributed DHO functionality.

To direct a transport bearer between a DHO node or a leaf Node B (in the DHO node tree) and a hierarchically higher DHO node or the RNC, the RNC conveys to the DHO node or leaf Node B the destination IP address and UDP port to be used in the uplink direction of the transport bearer in the same way as in the solution with modified protocols. That is, in essence, unless the hierarchically higher node is the RNC itself, the RNC replaces an IP address and a UDP port of the RNC (that would have been included in the message if distributed macro diversity had not been used) by an IP address and a UDP port of the hierarchically higher DHO node. The receiving node returns the destination IP address and UDP port to be used in the downlink direction of the transport bearer.

Instructions pertaining to transport bearers towards a hierarchically lower node, i.e. direction of a split data flow, are trickier and have to be coupled with the mechanism for initiation of DHO functionality in a DHO node.

As stated above the RNC may not explicitly instruct a DHO node of what destination IP address and UDP port to use for a transport bearer towards a hierarchically lower node. Actually, the RNC may not even explicitly inform a Node B that it has been selected as a DHO node and when the DHO functionality should be initiated or terminated. Instead a DHO enabled Node B has to rely on implicit information in the data flows to trigger initiation and termination of the DHO functionality and to find out where to direct split data flows.

A DHO enabled Node B checks the source address of all the IP packets it receives at the IP address and UDP port allocated to the transport bearer(s) of a certain DCH. If a packet with a source address other than that of the next hierarchically higher node (or one of its next hierarchically lower nodes if the Node B is already acting as a DHO node) is received, this packet has to originate from a hierarchically lower node. This indicates to the Node B that it has become a DHO node for a new macro diversity leg of the concerned DCH and the destination IP address and UDP port to use for the split downlink flow for the new macro diversity leg are the same as the source IP address and UDP port of the received packet. The Node B then initiates the required DHO functionality and starts to perform splitting and combining accordingly. This principle is not used in an ATM UTRAN or an IP UTRAN with a transport layer control plane protocol, because in these types of UTRAN a Node B cannot send data to a hierarchically higher node, until the hierarchically higher node has established the transport bearer towards the Node B.

The Node B does not receive any explicit QoS instructions for the new transport bearer towards the hierarchically lower node, so if needed, the Node B derives the required QoS information from the DCH characteristics (which is already known in the Node B) or copies the QoS class (e.g. DiffServ code points) used for the transport bearer of the same DCH towards the next hierarchically higher node.

Termination of DHO Functionality

When a Node B acting as a DHO node detects that a hierarchically lower node is no longer using a macro diversity leg for a certain DCH, it should terminate the DHO functionality for that macro diversity leg. To detect that a hierarchically lower node has stopped using a macro diversity leg for a certain DCH a DHO node maintains a counter (in its basic form denoted simpleAbsentUplinkFramesCounter) for each DCH macro diversity leg. The simpleAbsentUplinkFramesCounter counts the consecutive absent uplink frames, i.e. it is increased by one for each consecutive TTI for which no uplink frame is received from the DCH macro diversity leg. When the DHO node has not received any uplink frames for a certain DCH from a certain hierarchically lower node for a preconfigured number (e.g. denoted maxAllowedAbsentFrames) of consecutive TTIs (alternatively for a certain preconfigured time period), the DHO node assumes that it should no longer act as a DHO node for the concerned macro diversity leg. Consequently the DHO node terminates the DHO functionality for the concerned DCH macro diversity leg. With this DHO termination trigger condition the maximum time period that a DHO node may maintain DHO functionality for a DCH macro diversity leg that is no longer being used by the hierarchically lower node is equal to maxErroneousDHOperiod=maxAllowedAbsentFrames×TTI.

With the above described DHO termination trigger mechanism there is a risk that a DHO node misinterprets a temporary interruption in the frame flow (e.g. due to DTX or poor radio conditions) and terminates the DHO functionality for a macro diversity leg that is still being used. (This risk is most significant when the DCH Frame Protocol operates in the "silent" mode. Then the Node B will not send any uplink DCH FP data frame during a certain TTI if the data received from the UE has a TFI indicating "number of TB equal to 0" (which means that there is no user data for this DCH during this TTI), e.g. due to DTX. Otherwise, when the DCH Frame Protocol operates in the "normal" mode, the Node B always sends an uplink DCH FP frame for each TTI when a valid transmission has been received from the UE, except during certain error conditions.) To reduce this risk the trigger mechanism may be refined in various ways. One way is to modify the trigger condition such that when counting the consecutive absent uplink frames for a DCH macro diversity leg, absent frames are disregarded (not counted) for TTIs for which no uplink frame was received from any of the other macro diversity legs either (i.e. the other macro diversity legs that the DHO node combines). The counter with this property is denoted selectiveAbsentUplinkFramesCounter and its threshold value is denoted maxAllowedSelectiveAbsentFrames (which typically is smaller than maxAllowedAbsentFrames). With this refinement the risk for erroneous termination of the DHO functionality for a macro diversity leg is very small. However, an undesirable consequence of the refinement is that the time period that a DHO node may maintain DHO functionality for a macro diversity leg that is no longer being used is theoretically unbounded. To avoid this undesirable property the refined trigger mechanism should be complemented with an additional condition constituting an upper limit for the number of consecutive absent uplink frames, irrespective of whether uplink frames are received from the other macro diversity legs or not. That is, the simpleAbsentUplinkFramesCounter is re-instituted, but with a greater threshold value, upperLimitMaxAllowedAbsentFrames (where upperLimitMaxAllowedAbsentFrames>maxAllowedAbsentFrames>maxAllowedSelectiveAbsent Frames). With this DHO termination trigger condition the maximum time period that a DHO node may maintain DHO functionality for a DCH macro diversity leg that is no longer being used by the hierarchically lower node is equal to maxErroneousDHOperiod=upperLimitMaxAllowedAbsent Frames×TTI. This is the preferred trigger mechanism for termination of the DHO functionality for a DCH macro diversity leg.

Another alternative way to refine the DHO termination trigger condition is to reset the counter of consecutive absent uplink frames for a DCH macro diversity leg every time no uplink frame is received from any of the other macro diversity legs (i.e. the other macro diversity legs that the DHO node combines). The counter with this property is denoted strictlySelectiveAbsentUplinkFramesCounter and its threshold value is denoted maxAllowedStrictlySelectiveAbsentFrames (which typically is smaller than both maxAllowedAbsentFrames and maxAllowedSelectiveAbsentFrames). However, if DTX is frequently used (and possibly if the radio conditions are poor), this trigger condition may cause a DHO node to erroneously maintain the DHO functionality for a DCH macro diversity leg (for which it should not longer act as a DHO node) for an arbitrary (unbounded) period of time. Therefore also this refined trigger mechanism should be complemented with a simpleAbsentUplinkFramesCounter and an upper limit for the number of consecutive absent uplink frames (upperLimitMaxAllowedAbsentFrames), irrespective of whether uplink frames are received from the other macro diversity legs or not. With this DHO termination trigger condition the maximum time period that a DHO node may maintain DHO functionality for a DCH macro diversity leg that is no longer being used by the hierarchically lower node is equal to maxErroneousDHOperiod=upperLimitMax AllowedAbsentFrames×TTI.

Since a Node B acting as a DHO node is always is a radio active DHO node in the solution without protocol modifications, it knows whether the DCH Frame Protocol operates in the normal or silent mode for a DCH. Hence, it can adapt the DHO termination trigger conditions accordingly. Preferably, higher upperLimitMaxAllowedAbsentFrames and maxAllowedAbsentFrames values should be used when the DCH Frame Protocol operates in the normal mode than when it operates in the silent mode. It would also be possible to use different trigger mechanisms (e.g. different counters) for the different DCH Frame Protocol modes.

A possible and preferable variation of all the above DHO termination trigger mechanisms is to let the DHO node terminate the DHO functionality for a macro diversity leg only if all the DCHs of the concerned UE fulfil the DHO termination trigger condition for the concerned macro diversity leg. This coordination of the DHO termination for the DCHs of the same UE would make the DHO termination trigger mechanism more accurate. (A corresponding coordination of the DHO initiation mechanism is however not possible, because the destination IP address and UDP port to be used for the split downlink flows are supplied by uplink packets separately for each DCH macro diversity leg.)

Another possible variation of the trigger mechanisms for termination of DHO functionality is to use timers instead of frame counters, but this variation would not necessarily improve performance, since the TTI may be different for different DCHs. (Adapting the timeout value for the timers to the TTI of each DCH would eliminate this problem, but then there would in practice be no difference between running a timer and counting TTIs.)

If a DHO node were still to misinterpret a temporary interruption in the frame flow and erroneously terminate the DHO functionality for a certain DCH macro diversity leg, then the DHO functionality would be reinitiated (according to the above described DHO initiation mechanism) as soon as an uplink frame is received from the concerned DCH macro diversity leg.

Using implicit information in the data flow to trigger termination of DHO functionality (as described above) implies that a DHO node will maintain DHO functionality for a DCH macro diversity leg for a period of time after the point in time after the hierarchically lower node stops sending uplink frames on the concerned transport bearer. Consequently the DHO node (denoted A to simplify this description) will keep sending split downlink frames to an IP address and UDP port that are no longer allocated to this DCH transport bearer in the hierarchically lower node (denoted B).

If the hierarchically lower node (B) has reallocated this IP address and UDP port to another DCH transport bearer (towards another hierarchically higher node C (note that node A and node C may be the same node but for different DCHs)), this situation will cause the DHO functionality to malfunction in the hierarchically lower node (B). The packets that the hierarchically lower node (B) receives from the erroneously splitting DHO node (A) has a different source IP address and UDP port than the packets received from the correct hierarchically higher node (C). Thus, if the hierarchically lower node (B) is DHO enabled, it will interpret the erroneously split packets from the old hierarchically higher node (A) as packets from a new hierarchically lower node and thus will initiate DHO functionality for what it believes to be a new macro diversity leg towards a hierarchically lower node (whereas it actually is an old macro diversity leg towards the old hierarchically higher node (A) which the old hierarchically higher node (A) has not stopped using yet). If the hierarchically lower node (B) is not DHO enabled, the situation may cause unpredictable behaviour in the hierarchically lower node (B).

To avoid this problem a Node B can make sure not to reallocate an IP address-UDP port pair for a time period no shorter than maxErroneousDHOperiod. After this time period a Node B may safely reallocate an IP address-UDP port pair, since any DHO functionality using this IP address-UDP port pair in a hierarchically higher DHO node should be terminated by then. This grace period for reallocation of IP address-UDP port pairs is a new functionality in a Node B. Hence, legacy (non-H-DHO aware) Node Bs in general cannot be used as leaf Node Bs in the solution with unmodified protocols. However, if a legacy (non-H-DHO aware) Node B filters incoming packets based on the source IP address (or source IP address and UDP port) such that packets with an unexpected source IP address (or unexpected source UDP port) are discarded, then this legacy Node B can be used as a leaf Node B in the solution with unmodified protocols.

Provided that a Node B uses an appropriate grace period for reallocation of IP address-UDP port pairs, a packet containing an erroneously split frame (from a hierarchically higher DHO node that has not stopped using an old transport bearer yet) will be received at an IP address-UDP port pair that is not in use. The Node B will then return a Destination Unreachable ICMP message (with the Code set to 'port unreachable'. To improve the DHO termination mechanism a DHO node may use the reception of this ICMP message as an indication that the DHO functionality for the concerned DCH macro diversity leg should be terminated. The above described counter based DHO termination trigger mechanisms should preferably be complemented with this ICMP based trigger mechanism in order to speed up the DHO termination and thereby save transmission resources.

It should be noted that all the methods for identifying the originating Node B of an uplink Node Synchronisation DCH FP control frame that were described for the embodiment with modified NBAP (and RNSAP) can be used also for the embodiment with unmodified protocols.

Parts of the special aspects associated with the inter-RNS case are the same for this embodiment as for the embodiment using modified NBAP and RNSAP. In the inter-RNS case the D-RNC more or less relays the information between the S-RNC and the Node Bs, using RNSAP towards the S-RNC and NBAP towards the Node Bs. It is however not a strict relay, since the D-RNC converts between two protocols.

If inter-RNS DCH transport bearers are always terminated in the D-RNC (which is possible according to the 3GPP standard), then no extension or modification of the RNSAP signaling is needed for the inter-RNS case of distributed DHO functionality. Instead the D-RNC can handle the distributed macro diversity mechanisms (i.e. selection of DHO nodes, providing DHO instructions, etc.) within its own RNS by itself independently of the S-RNC (provided that the S-RNC has not indicated that the D-RNC must not perform DHO functionality for a particular macro diversity leg).

An inter-RNS aspect that is special to the embodiment using unmodified protocols is that assuming that the principle of not terminating inter-RNS DCH transport bearers in the D-RNC is used, then a D-RNC cannot be selected as a DHO node, because the required DHO related instructions cannot be conveyed from the S-RNC. In addition, the D-RNC does not have an allocated IP address-UDP port pair to which the S-RNC could direct the data flows from hierarchically lower Node Bs.

Figure 17:
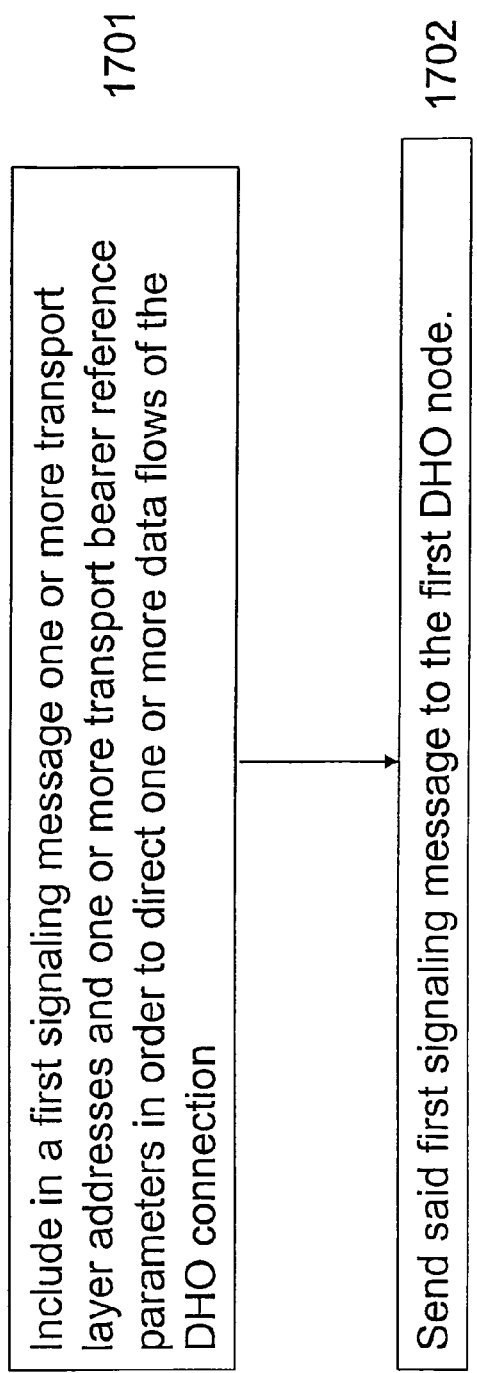
FIG. 17 is a flowchart of a non-limiting example method.

To summarize, as illustrated in FIG. 17, a non-limiting method for providing DHO related instructions to a first DHO tree node, e.g. a Node B, that is or is planned to be a part of a DHO connection in a mobile telecommunication network, wherein the DHO functionality is distributed to one or a plurality of DHO nodes, such as a Radio Network Controller, RNC, and its connected Node Bs, in said network, comprises the steps of:
- 1701. Include in a first signaling message one or more transport layer addresses and one or more transport bearer reference parameters in order to direct one or more data flows of the DHO connection.
- 1702. Send said first signaling message to the first DHO tree node.

The method above may be implemented by a computer program product. The computer program product is directly loadable into the internal memory of a computer within a DHO node, e.g. a Radio Network Controller and/or a Node B in a mobile telecommunication network, and comprises the software code portions for performing the steps of said method. Furthermore, the computer program product is stored on a computer usable medium, and comprises readable program for causing a computer, within a DHO node, e.g. a Radio Network Controller and/or a Node B in a mobile telecommunication system, to control an execution of the steps of said method.

Thus, a non-limiting example RNC comprises means for including in a signaling message one or more transport layer addresses and one or more transport bearer reference parameters in order to direct one or more data flows of the DHO connection and means for sending said signaling message to a DHO tree node.

Moreover, a non-limiting example DHO node comprises means for using implicit information in data received from a hierarchically lower DHO tree node to trigger the initiation of DHO functionality for a macro diversity leg towards the hierarchically lower DHO tree node, wherein said DHO functionality comprises splitting and combining of data flows.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method for providing diversity handover, DHO, related instructions to a first DHO tree node that is a part of or is planned to be a part of a DHO connection in a mobile telecommunication network, wherein the DHO functionality is distributed to one or a plurality of DHO nodes, including a Radio Network Controller (RNC) and its connected Node Bs, in the network, the method comprising:
   a DHO node including in a first signaling message one or more transport layer addresses and one or more transport bearer reference parameters in order to direct one or more data flows between the RNC and a mobile station of the DHO connection, and
   the DHO node sending the first signaling message to the first DHO tree node, wherein the DHO functionality performed by the first DHO tree node comprises splitting of downlink data flows and combining of uplink data flows,
   wherein the first DHO tree node is separate from the RNC, and wherein the including-step comprises replacing the transport layer address and transport bearer reference parameter of the RNC by transport layer address and transport bearer reference parameter of a DHO tree node that is hierarchically higher than the first DHO tree node in a regular signaling message sent to the first DHO tree node in order to direct a data flow between the first DHO tree node and the higher DHO tree node in a DHO tree node hierarchy.

2. The method according to claim 1, wherein the including-step comprises:
   the DHO node replacing the transport layer address and transport bearer reference parameter of the RNC by transport layer address and transport bearer reference parameter of a DHO tree node that is hierarchically higher than the first DHO tree node in a regular signaling message sent to the first DHO tree node in order to direct a data flow between the first DHO tree node and the higher DHO tree node in a DHO tree node hierarchy.

3. The method according to claim 1, wherein the including-step comprises:
   the DHO node including one or more transport layer addresses and one or more transport bearer reference parameters of one or more DHO tree node(s) that are hierarchically lower than the first DHO tree node in a signalling message sent to the first DHO tree node in order to direct the one or more data flows between the first DHO tree node and the one or more lower DHO tree node(s) in a DHO tree node hierarchy.

4. The method according to claim 1, wherein said transport layer addresses are IP addresses and said transport bearer reference parameters are User Datagram Protocol (UDP) ports.

5. The method according to claim 1, wherein said transport layer addresses are ATM addresses and said transport bearer reference parameters are Served User Generated Reference (SUGR) parameters.

6. The method according to claim 1, further comprising:
   the DHO node including in the first signaling message Quality of Service (QoS) indications for the one or more data flow(s) to be directed.

7. The method according to claim 1, further comprising:
   the DHO node including timing parameters in the first signaling message to be used in the uplink combining procedure in the DHO tree node receiving the first signaling message.

8. The method according to claim 1, further comprising:
   the DHO node including a time indication in the first signaling message indicating when the DHO related instructions in the first signaling message are to be effectuated in the DHO tree node receiving the first signaling message.

9. The method according to claim 8, wherein said time indication is a connection frame number (CFN) pertaining to a Dedicated Channel Frame Protocol (DCH FP) in a UMTS Terrestrial Radio Access Network (UTRAN).

10. The method according to claim 1, wherein said first signaling message is sent from the RNC.

11. The method according to claim 10, wherein said first signaling message is a Node B Application Part (NBAP) message.

12. The method according to claim 10, wherein the step of sending said first signaling message is triggered by a second signaling message received from a second RNC.

13. The method according to claim 12, wherein the second signaling message is a Radio Network Subsystem Application Part (RNSAP) message.

14. The method according to claim 12, wherein the second signaling message includes the same DHO related instructions and associated parameters as said the signaling message.

15. The method according to claim 14, wherein the second signaling message further includes a destination node transport layer address of the first DHO tree node that is an intended recipient of the DHO related instructions.

16. The method according to claim 15, wherein the destination node transport layer address is an IP address.

17. The method according to claim 15, wherein the destination node transport layer address is an ATM address.

18. The method according to claim 1, wherein the mobile telecommunication network is a UMTS network.

19. The method according to claim 1, further comprising:
the DHO node using implicit information at the first DHO tree node in data received from a hierarchically lower DHO tree node to trigger an initiation of DHO functionality for a macro diversity leg towards the hierarchically lower DHO tree node.

20. The method according to claim 19, wherein the implicit information comprises a source IP address and a source User Datagram Protocol (UDP) port retrieved from an IP header and a UDP header of a received uplink packet.

21. The method according to claim 20, wherein the source IP address is different from an address used for packets received from a hierarchically higher DHO tree node and other hierarchically lower DHO tree nodes than the hierarchically lower DHO tree node from which the uplink packet was received.

22. The method according to claim 20, further comprising:
the DHO node using the retrieved source IP address and User Datagram Protocol (UDP) port at the first DHO tree node as destination IP address and destination UDP port for the split downlink data flow for the macro diversity leg towards the hierarchically lower DHO tree node.

23. The method according to claim 1, further comprising:
the DHO node terminating the DHO functionality at the first DHO tree node for a macro diversity leg towards a hierarchically lower DHO tree node based on an absence of expected uplink data packets from a hierarchically lower DHO tree node.

24. The method of claim 1, further comprising:
the DHO node terminating the DHO functionality at the first DHO tree node for a macro diversity leg towards a hierarchically lower DHO tree node based on a reception of an indication that a hierarchically lower DHO tree node no longer uses the macro diversity leg.

25. The method of claim 24, wherein said indication is a Destination Unreachable Internet Control Message Protocol (ICMP) message.

26. A non-transitory computer program product directly loadable into the internal memory of a computer within a Diversity Handover node (DHO) including a Radio Network Controller or a Node B, in a mobile telecommunication network, wherein a computer program is provided therein, the computer comprising the software code portions to causing the RNC or node B to performing the method of claim 1.

27. A non-transitory computer readable medium, in which a readable program is recording therein, the readable program causes a computer, within a Diversity Handover node including a Radio Network Controller or a Node B, in a mobile telecommunication network, to control an execution of the method of claim 1.

28. A Radio Network Controller, (RNC), for providing diversity handover, (DHO), related instructions to a first DHO tree node that is a part of or is planned to be a part of a DHO connection in a mobile telecommunication network, wherein the DHO functionality is distributed to one or a plurality of DHO nodes the RNC and its connected Node Bs, in said network, the RNC comprising:
means for including in a first signaling message one or more transport layer addresses and one or more transport bearer reference parameters in order to direct one or more data flows between the RNC and a mobile station of the DHO connection, and
means for sending said first signaling message to the first DHO tree node,
Wherein the DHO functionality performed by the first DHO tree node comprises splitting of downlink data flows and combining of uplink data flows,
Wherein the first DHO tree node is separate from RNC, and wherein the means for including comprises means for replacing the transport layer address and transport bearer reference parameter of an RNC by the transport layer address and transport bearer reference parameter of a DHO tree node that is hierarchically higher than said first DHO tree node in a regular signaling message sent to the first DHO tree node in order to direct a data flow between said first DHO tree node and said higher DHO tree node in the DHO tree node hierarchy.

29. The RNC according to claim 28, wherein the means for including comprises:
means for replacing the transport layer address and transport bearer reference parameter of the RNC by transport layer address and transport bearer reference parameter of a DHO tree node that is hierarchically higher than the first DHO tree node in a regular signaling message sent to the first DHO tree node in order to direct a data flow between the first DHO tree node and the higher DHO tree node in a DHO tree node hierarchy.

30. The RNC according to claim 28, wherein the means for including comprises:
means for including one or more transport layer addresses and one or more transport bearer reference parameters of one or more DHO tree node(s) that are hierarchically lower than the first DHO tree node in a signalling message sent to the first DHO tree node in order to direct one or more data flows between the first DHO tree node and said one or more lower DHO tree node(s) in a DHO tree node hierarchy.

31. The RNC according to claim 28, wherein the transport layer addresses are IP addresses and the transport bearer reference parameters are User Datagram Protocol (UDP) ports.

32. The RNC according to claim 28, wherein the transport layer addresses are ATM addresses and the transport bearer reference parameters are Served User Generated Reference (SUGR) parameters.

33. The RNC according to claim 28, further comprising:
means for including in the first signaling message Quality of Service (QoS) indications for the one or more data flow(s) to be directed.

34. The RNC according to claim 28, further comprising:
means for including timing parameters in the first signaling message to be used in the uplink combining procedure in the DHO tree node receiving the first signaling message.

35. The RNC according to claim 28, further comprising:
means for including a time indication in the signaling message indicating when the DHO related instructions in the signalling message are to be effectuated in the DHO tree node receiving the first signaling message.

36. The RNC according to claim 35, wherein the time indication is a connection frame number (CFN) pertaining to a Dedicated Channel Frame Protocol (DCH FP) in a UMTS Terrestrial Radio Access Network (UTRAN).

37. The RNC according to claim 28, wherein the first signaling message is a Node B Application Part (NBAP) message.

38. The RNC according to claim 28, wherein the means for sending the first signaling message is triggered by a second signaling message received from a second RNC.

39. The RNC according to claim 38, wherein the second signaling message is a Radio Network Subsystem Application Part (RNSAP) message.

40. The RNC according to claim 38, wherein the second signaling message includes the same DHO related instructions and associated parameters as the first signaling message.

41. The RNC according to claim 40, wherein the second signaling message further comprises a destination node transport layer address of the first DHO tree node that is the intended recipient of the DHO related instructions.

42. The RNC according to claim 41, wherein the destination node transport layer address is an IP address.

43. The RNC according to claim 41, wherein the destination node transport layer address is an ATM address.

44. The RNC according to claim 28, wherein the mobile telecommunication network is a UMTS network.

45. A Diversity Handover, (DHO), node that is a part of or is planned to be a part of a DHO connection in a mobile telecommunication network, wherein the DHO functionality is distributed to one or a plurality of DHO nodes, such as a Radio Network Controller, (RNC), and its connected Node Bs, in the network, the DHO node comprising:
  means for using implicit information in data received from a hierarchically lower DHO tree node to trigger the initiation of DHO functionality for a macro diversity leg towards the hierarchically lower DHO tree node,
  wherein said DHO functionality performed by the DHO node comprises splitting downlink data flows from the RNC to the mobile station and combining uplink data flows from the mobile station to the RNC,
  wherein the DHO node is separate from the RNC,
  wherein the implicit information comprises a source IP address and a source User Datagram Protocol (UDP) port retrieved from an IP header and an UDP header of a received uplink packet, and
  wherein the source IP addresses is different from a source IP address used for packets received from a hierarchically higher DHO tree node and other hierarchically lower DHO tree nodes than the hierarchically lower DHO tree node from which uplink packet was received.

46. The DHO node according to claim 45, further comprising:
  mean for using the retrieved source IP address and UDP port as the destination IP address and destination UDP port for the split downlink data flow for the macro diversity leg towards the hierarchically lower DHO tree node.

47. The DHO node according to claim 45, further comprising:
  means for terminating the DHO functionality for a macro diversity leg towards a hierarchically lower DHO tree node based on an absence of expected uplink data packets from the hierarchically lower DHO tree node.

48. The DHO node of claim 45, further comprising:
  means for terminating the DHO functionality for a macro diversity leg towards a hierarchically lower DHO tree node based on a reception of an indication that the hierarchically lower DHO tree node no longer uses the macro diversity leg.

49. The DHO node of claim 48, wherein said indication is a Destination Unreachable Internet Control Message Protocol (ICMP) message.

* * * * *

UNITED STATES PATENT AND TRADEMARK OFFICE
CERTIFICATE OF CORRECTION

| | |
|---|---|
| PATENT NO. | : 7,991,398 B2 |
| APPLICATION NO. | : 10/583894 |
| DATED | : August 2, 2011 |
| INVENTOR(S) | : Rune |

It is certified that error appears in the above-identified patent and that said Letters Patent is hereby corrected as shown below:

In Column 5, Line 23, delete "RNCS)." and insert -- RNCs). --, therefor.

In Column 27, Line 41, in Claim 1, delete "DHO," and insert -- (DHO), --, therefor.

In Column 27, Line 46, in Claim 1, delete "Controller (RNC)" and
insert -- Controller, (RNC), --, therefor.

In Column 27, Line 59, in Claim 1, delete "comprises" and
insert -- comprises the DHO node --, therefor.

In Column 27, Line 63, in Claim 1, delete "higher" and insert -- different --, therefor.

In Column 27, Line 66, in Claim 1, delete "higher" and insert -- different --, therefor.

In Column 29, Line 15, in Claim 20, delete "address" and insert -- addresses --, therefor.

In Column 29, Line 19, in Claim 21, delete "an address" and insert -- a addresses --, therefor.

In Column 29, Line 50, in Claim 26, delete "computer" and insert -- computer program --, therefor.

In Column 29, Line 51, in Claim 26, delete "node B to performing" and insert
-- the Node B to perform --, therefor.

In Column 29, Line 53, in Claim 27, delete "recording" and insert -- recorded --, therefor.

In Column 30, Line 2, in Claim 28, delete "connection," and insert -- connection; --, therefor.

In Column 30, Line 3, in Claim 28, delete "said" and insert -- the --, therefor.

Signed and Sealed this
Eighth Day of May, 2012

David J. Kappos
*Director of the United States Patent and Trademark Office*

CERTIFICATE OF CORRECTION (continued)
U.S. Pat. No. 7,991,398 B2

In Column 30, Line 5, in Claim 28, delete "Wherein" and insert -- wherein --, therefor.

In Column 30, Line 8, in Claim 28, delete "Wherein" and insert -- wherein --, therefor.

In Column 30, Line 8, in Claim 28, delete "RNC," and insert -- the RNC, --, therefor.

In Column 30, Line 11, in Claim 28, delete "an RNC by the" and insert -- the RNC by --, therefor.

In Column 30, Line 14, in Claim 28, delete "higher than said" and insert
-- different than the --, therefor.

In Column 30, Line 17, in Claim 28, delete "said first DHO tree node and said higher" and
insert -- the first DHO tree node and the different --, therefor.

In Column 30, Line 18, in Claim 28, delete "the DHO" and insert -- a DHO --, therefor.

In Column 31, Line 23, in Claim 45, delete "a plurality of" and insert -- more --, therefor.

In Column 31, Line 23, in Claim 45, delete "nodes, such as" and insert -- including --, therefor.

In Column 31, Lines 27-28, in Claim 45, delete "the initiation of DHO" and
insert -- an initiation of the DHO --, therefor.

In Column 31, Line 30, in Claim 45, delete "said DHO" and insert -- the DHO --, therefor.

In Column 31, Line 32, in Claim 45, delete "the mobile" and insert -- a mobile --, therefor.

In Column 32, Line 6, in Claim 45, delete "addresses" and insert -- address --, therefor.

In Column 32, Line 10, in Claim 45, delete "which" and insert -- which the --, therefor.

In Column 32, Line 16, in Claim 46, delete "the hierarchically" and insert
-- said hierarchically --, therefor.